United States Patent
Hayashi et al.

(10) Patent No.: US 8,553,262 B2
(45) Date of Patent: Oct. 8, 2013

(54) INFORMATION PROCESSING APPARATUS, INFORMATION PROCESSING APPARATUS UTILIZATION SYSTEM, AND METHOD FOR EDITING PROCESSING CONDITION

(75) Inventors: Takahiko Hayashi, Tokyo (JP); Daisuke Noguchi, Tokyo (JP); Yumiko Murata, Tokyo (JP)

(73) Assignee: Ricoh Company, Ltd., Tokyo (JP)

( * ) Notice: Subject to any disclaimer, the term of this patent is extended or adjusted under 35 U.S.C. 154(b) by 627 days.

(21) Appl. No.: 12/838,775

(22) Filed: Jul. 19, 2010

(65) Prior Publication Data

US 2011/0019229 A1    Jan. 27, 2011

(30) Foreign Application Priority Data

Jul. 21, 2009  (JP) ................................ 2009-170326

(51) Int. Cl.
- G06F 3/12 (2006.01)
- G06F 7/00 (2006.01)
- G06K 15/00 (2006.01)

(52) U.S. Cl.
USPC ....... 358/1.15; 358/1.13; 358/1.14; 358/1.18; 707/706; 707/707; 707/708; 707/713

(58) Field of Classification Search
None
See application file for complete search history.

(56) References Cited

U.S. PATENT DOCUMENTS

2009/0201551 A1*  8/2009  Uchida ........................ 358/1.15

FOREIGN PATENT DOCUMENTS

| JP | 2003-87479 | 3/2003 |
| JP | 2007-282181 | 10/2007 |
| JP | 4217707 | 11/2008 |

OTHER PUBLICATIONS

Machine translation of JP Pub 2003087479 to Kameyama Kenji.*

* cited by examiner

*Primary Examiner* — Benny Q Tieu
*Assistant Examiner* — Haris Sabah
(74) *Attorney, Agent, or Firm* — Oblon, Spivak, McClelland, Maier & Neustadt, L.L.P.

(57) ABSTRACT

A disclosed information processing apparatus includes an acquisition unit configured to acquire first processing condition information stored in a server via a network, a processing condition storage unit configured to store the first processing condition information acquired from the server via the network, a display unit configured to display the first processing condition information stored in the processing condition storage unit, an edition receiving unit configured to receive an edition of the first processing condition information displayed on the display unit, an execution unit configured to set the first processing condition information edited by the edition receiving unit to execute information processing based on the set first processing condition information, and a processing condition registration unit configured to register the first processing condition information set by the execution unit in the processing condition storage unit.

11 Claims, 31 Drawing Sheets

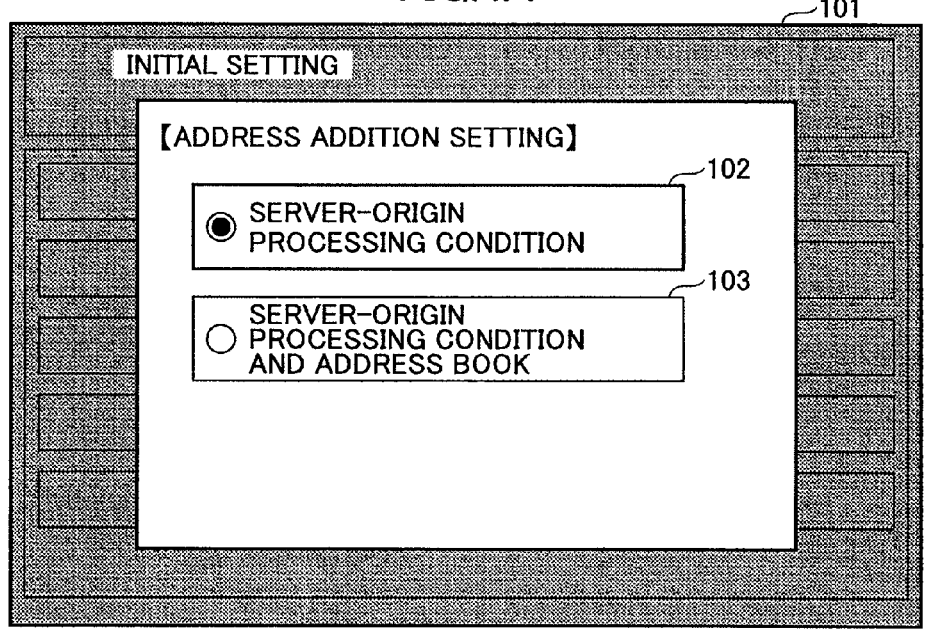
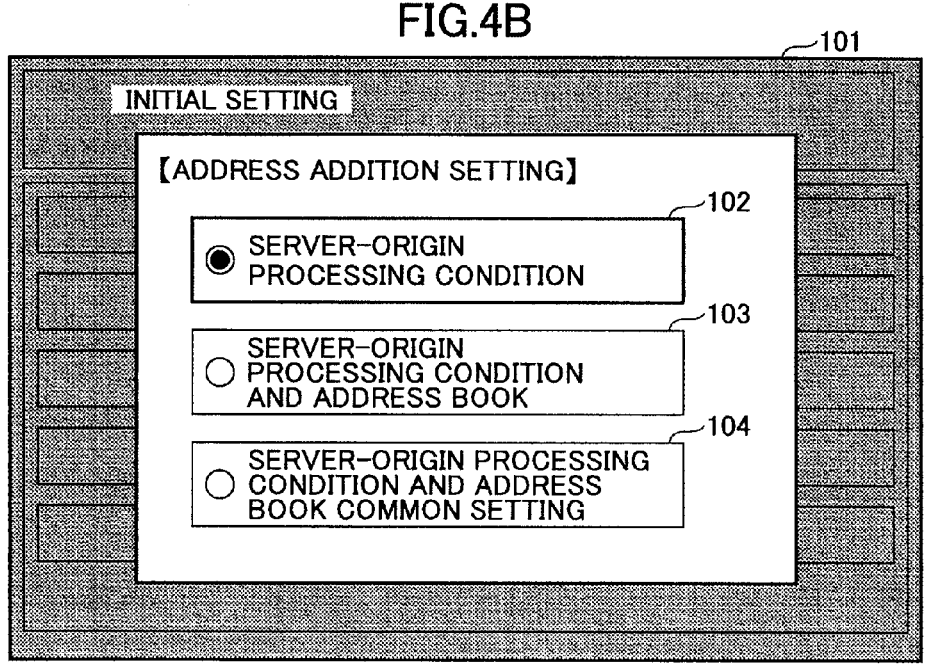

| | USER zzzz (USER ID) | |
|---|---|---|
| SCANNER | PROCESSING CONDITION 1 | PROCESSING CONDITION 2 ※ |
| ADDRESS | takaka@dd.com<br>aaaa@bbbb<br>eeee@ffff | ffff@gggg<br>hhhh@iiii<br>iiii@jjjj |
| DOCUMENT TYPE | CHARACTER | PHOTOGRAPH |
| RESOLUTION | 400dpi | 600dpi |
| SIZE | AUTOMATIC DETECTION | A4 |
| COLOR MODE | MONOCHROME | COLOR |
| FILE FORMAT | PDF | Tiff |

FIG.8A

| | ADDRESS BOOK (ADDRESS) | |
|---|---|---|
| USER | ADDRESS | PROCESSING CONDITION NUMBER |
| mamahiyo | suchann@murataku.ac.jp | — |
| noguccie | daaa@temada | — |
| bbbbb | bbb@cccc | — |
| cccc | cccc@dddd | — |
| dddd | dddd@eeee | — |
| gggg | gggg@hhhh | — |
| jjjj | jjjj@kkkk | |
| kkkk | kkkk@llll | |

FIG.8B

| USER | ADDRESS BOOK (ADDRESS) ADDRESS | PROCESSING CONDITION NUMBER |
|---|---|---|
| taka | takaka@dd.com | 1 |
| mamahiyo | suchann@murataku.ac.jp | — |
| aaaaa | aaa@bbbb | 1 |
| noguccie | daaa@temada | — |
| ffff | ffff@gggg | 2 |
| bbbbb | bbb@cccc | — |
| cccc | cccc@dddd | — |
| dddd | dddd@eeee | — |
| eeee | eeee@ffff | 1 |
| gggg | gggg@hhhh | — |
| hhhh | hhhh@iiii | 2 |
| iiii | iiii@jjjj | 2 |
| jjjj | jjjj@kkkk | — |
| kkkk | kkkk@llll | — |
| llll | llll@mmmm | 3 |
| Mmmm | mmmm@nnnn | 3 |

FIG.9A

| DOCUMENT TYPE | PROCESSING CONDITION NUMBER |
|---|---|
| CHARACTER | 1 |
| CHARACTER | — |
| PHOTOGRAPH | — |
| CHARACTER AND PHOTOGRAPH | — |

FIG.9B

| RESOLUTION | PROCESSING CONDITION NUMBER |
|---|---|
| 100dpi | — |
| 200dpi | — |
| 300dpi | 2 |
| 300dpi | — |
| 400dpi | 1 |
| 600dpi | — |

FIG.9C

| SIZE | PROCESSING CONDITION NUMBER |
|---|---|
| AUTOMATIC DETECTION | 1 |
| A4 | 1 |
| A5 | — |
| B4 | 2 |
| A3 | — |

FIG.9D

| COLOR MODE | PROCESSING CONDITION NUMBER |
|---|---|
| COLOR | — |
| MONOCHROME | 1 |
| GRAY SCALE | — |

FIG.9E

| FILE FORMAT | PROCESSING CONDITION NUMBER |
|---|---|
| PDF | 1 |
| Tiff | — |
| BMP | 1 |
| JPEG | — |

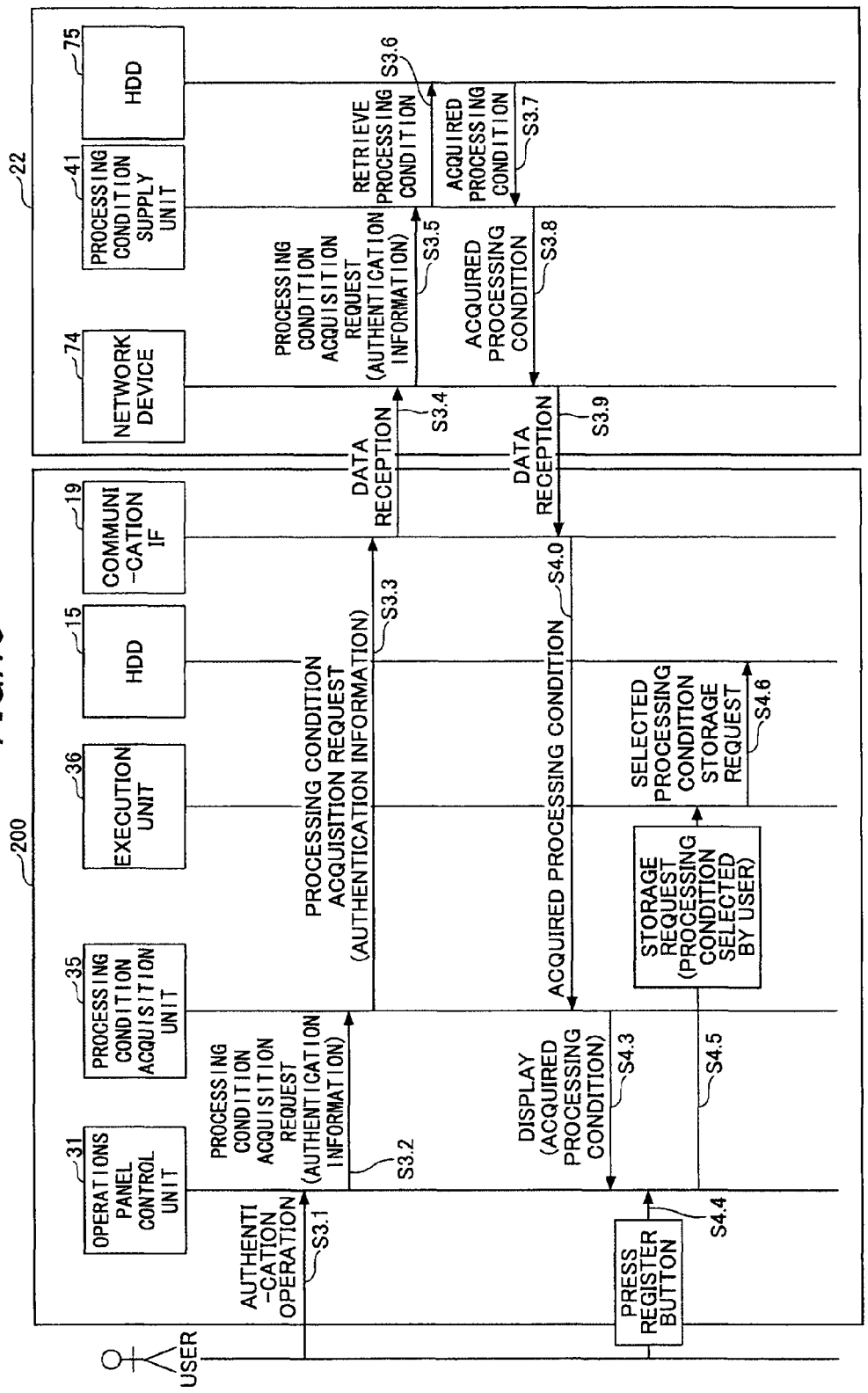

FIG.14

| USER | ADDRESS BOOK (ADDRESS) | |
|---|---|---|
| | ADDRESS | PROCESSING CONDITION NUMBER |
| taka | takaka@dd.com | 1 |
| aaaaa | aaa@bbbb | 1 |
| ffff | ffff@gggg | 2 |
| eeee | eeee@ffff | 1 |
| hhhh | hhhh@iiii | 2 |
| llll | llll@mmmm | 3 |
| Mmmm | mmmm@nnnn | 3 |

| ADDRESS BOOK (ADDRESS) | | | |
|---|---|---|---|
| USER | ADDRESS | PROCESSING CONDITION NUMBER | TIME OF ADDITION |
| taka | takaka@dd.com | 1 | THREE DAYS AGO |
| mamahiyo | suchann@murataku.ac.jp | — | TWO DAYS AGO |
| aaaaa | aaa@bbbb | 1 | |
| noguccie | daaa@temada | — | |
| ffff | ffff@gggg | 2 | ONE DAY AGO |
| bbbbb | bbb@cccc | — | |
| cccc | cccc@dddd | — | |
| dddd | dddd@eeee | — | |
| eeee | eeee@ffff | 1 | |
| gggg | gggg@hhhh | — | |
| hhhh | hhhh@iiii | 2 | |
| jjjj | jjjj@kkkk | — | |
| kkkk | kkkk@llll | — | |
| llll | llll@mmmm | 3 | |
| Mmmm | mmmm@nnnn | 3 | |

FIG.20

INFORMATION PROCESSING APPARATUS, INFORMATION PROCESSING APPARATUS UTILIZATION SYSTEM, AND METHOD FOR EDITING PROCESSING CONDITION

BACKGROUND OF THE INVENTION

1. Field of the Invention

This invention generally relates to an information processing apparatus configured to process information based on a processing condition, and more specifically to an information processing apparatus capable of editing the processing condition, a utilization system for such an information processing apparatus, and a method for editing the processing condition.

2. Description of the Related Art

In the network systems, directory services are often used. A directory service is a service such as the "active directory" with which network resources such as information on users, printers, facsimile machines and the like connected over the computer networks such as a local area network or LAN can be made searchable. The directory service can be used in various manners. For example, Japanese Patent Application Publication No. 2003-087479 discloses a technology in which processing conditions of apparatuses, such as settings for printing, reading, image data distribution, and distributing users, are preliminarily registered in an external server, and a corresponding one of the settings is applied to the apparatus to execute the information processing. With this technology, users are able to carry out desired processing with minimum operations of the apparatus.

More specifically, in the technology disclosed in Japanese Patent Application Publication No. 2003-087479, when a user ID is input to a scanner, the scanner transmits the user ID via the network to a scan server so as to determine whether the transmitted user ID matches any of user IDs registered in an internal memory. Subsequently, if the transmitted user ID matches one of the registered user IDs, the scan server transmits information to be retrieved corresponding to the matched user ID to the scanner.

In this image reading system, if change, addition, and deletion of items of the received processing condition are made by operating an operations panel of the apparatus, the usability of the apparatus can be significantly improved for the user. However, if the user is allowed to make the change, addition, and deletion in the processing condition without being restricted, there may be few advantages for managing such processing condition in the server, and the security level of the apparatus or the system may be lowered. Since the processing condition includes a delivery destination (address) of image data, change of the delivery destination may particularly lower the security level of the apparatus and the image reading system.

If, on the other hand, the user is unable to make any change in the processing condition via the apparatus, the usability of the apparatus may significantly be lowered. Accordingly, in the related art technology, it appears difficult to improve the usability of the apparatus under the controlled processing condition while maintaining a certain security level of the apparatus.

SUMMARY OF THE INVENTION

It is a general object of at least one embodiment of the present invention to provide an information processing apparatus, an information processing utilization system, and a method for editing a processing condition capable of improving the usability of the information processing apparatus while maintaining a certain security level thereof, and substantially eliminate one or more problems caused by the limitations and disadvantages of the related art.

In one embodiment, an information processing apparatus includes an acquisition unit configured to acquire first processing condition information stored in a server via a network, a processing condition storage unit configured to store the first processing condition information acquired from the server via the network, a display unit configured to display the first processing condition information stored in the processing condition storage unit, an edition receiving unit configured to receive an edition of the first processing condition information displayed on the display unit, an execution unit configured to set the first processing condition information edited by the edition receiving unit to execute information processing based on the set first processing condition information, and a processing condition registration unit configured to register the first processing condition information set by the execution unit in the processing condition storage unit.

Other objects and further features of embodiments will become apparent from the following detailed description when read in conjunction with the accompanying drawings.

BRIEF DESCRIPTION OF THE DRAWINGS

FIGS. 4A and 4B are diagrams illustrating examples of address addition setting screens;

FIGS. 8A and 8B are diagrams illustrating examples of an address book of an in-apparatus processing condition and an address book of a mixed processing condition composed of a processing condition obtained from the in-apparatus processing condition and a processing condition originally obtained from the server;

FIGS. 9A through 9E are diagrams illustrating examples of respective sets of items of the in-apparatus processing condition and the processing condition obtained from the processing condition DB of the server;

FIG. 10 is a sequence diagram illustrating an example of a procedure of setting of the processing condition obtained from the server to the image forming apparatus via the network;

FIG. 14 is a diagram illustrating an example of the address book of FIG. 8B from which addresses having the processing condition number of "-" are excluded;

FIG. 20 is a diagram illustrating an example of an address book having time stamp information;

DESCRIPTION OF THE PREFERRED EMBODIMENTS

In the following, preferred embodiments of the invention are described with reference to the accompanying drawings.

Embodiments

First Embodiment

Figure 1:
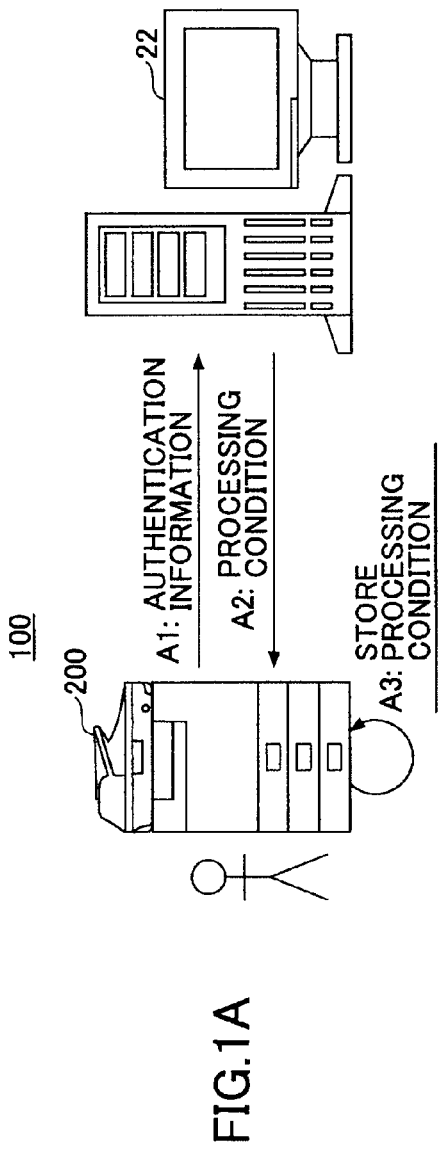
FIGS. 1A and 1B are schematic diagrams illustrating examples of image forming apparatus utilization systems according to embodiments of the invention.

First, an image forming apparatus utilization system 100 according to a first embodiment is described with reference to FIGS. 1A and 1B. As illustrated in FIGS. 1A and 1B, an image forming apparatus 200 is connected to a server 22 via a network.

[Outline of Image Forming Apparatus Utilization System 100]

(A1) A user of the image forming apparatus 200 inputs the user's authentication information (a user ID and password combination) to log into the image forming apparatus 200. The image forming apparatus 200 transmits the user's authentication information to the server 22.

(A2) When the image forming apparatus 200 transmits the user's authentication information to the server 22, the server 22 transmits to the image forming apparatus 200 a corresponding one of the processing conditions available to the user.

(A3) The user verifies the processing condition transmitted from the server 22 and presses a "register" button on an operations panel. When the user presses the register button, the forming apparatus 200 stores the processing condition transmitted from the server 22 in a storage device such as a hard disk drive (HDD).

Note that in a second embodiment described later, the processing condition received from the server 22 is stored in the storage device such as a hard disk drive (HDD) after the image forming apparatus 200 carries out information processing based on the processing condition received from the server 22 initiated by the user's pressing of a "start" button instead of the "register" button.

So far, a procedure of storing a processing condition has been described. Next, a procedure of editing the processing condition is described. In this procedure, when the user utilizes the processing condition stored in the server 22, the user edits the processing condition that is transmitted from the server 22 and received by the image forming apparatus 200.

(B1) The user of the image forming apparatus 200 inputs the user's authentication information (a user ID and password combination) to log into the image forming apparatus 200.

(B2) When the image forming apparatus 200 transmits the user's authentication information to the server 22, the server transmits a corresponding one of processing conditions available to the user to the image forming apparatus 200.

(B3) The image forming apparatus 200 displays either the processing condition stored in the storage device (originally transmitted from the server 22) alone, or both the processing condition stored in the storage device (originally transmitted from the server 22) and an in-apparatus processing condition that has been preliminarily stored in the image forming apparatus 200 (i.e., originally stored in the image forming apparatus 200) by the user's operation of the operations panel.

(B4) The user is now capable of creating a new processing condition by editing the processing condition stored in the storage device alone, or both the processing condition stored in the storage device and the in-apparatus processing condition preliminarily stored in the image forming apparatus 200 in order to carry out information processing based on the edited processing condition.

(B5) The user presses, on finishing the editing of the processing condition, a "store" button on the operations panel. The forming apparatus 200 stores, on receiving a "store" command of the processing condition transmitted by the user's pressing of the button, the received processing condition in the storage device such as a hard disk drive (HDD).

Accordingly, the user is able to create the new processing condition for carrying out the information processing by editing processing condition items within a range of either the processing condition stored in the storage device alone (hereinafter also called a "first processing condition") or both the processing condition stored in the storage device (i.e., first processing condition) and the in-apparatus processing condition preliminarily stored in the image forming apparatus 200 (hereinafter also called a "second processing condition"). That is, items of a processing condition that the user is able to edit and set for the image forming apparatus 200 are either items of the processing condition originally stored in the server 22 (i.e., first processing condition) or items of the in-apparatus processing condition preliminarily stored in the image forming apparatus 200 (i.e., second processing condition). Therefore, the security level is not be lowered. Therefore, the usability of the image forming apparatus can be improved while maintaining a certain apparatus security level.

[Image Forming Apparatus 200]

Figure 2:
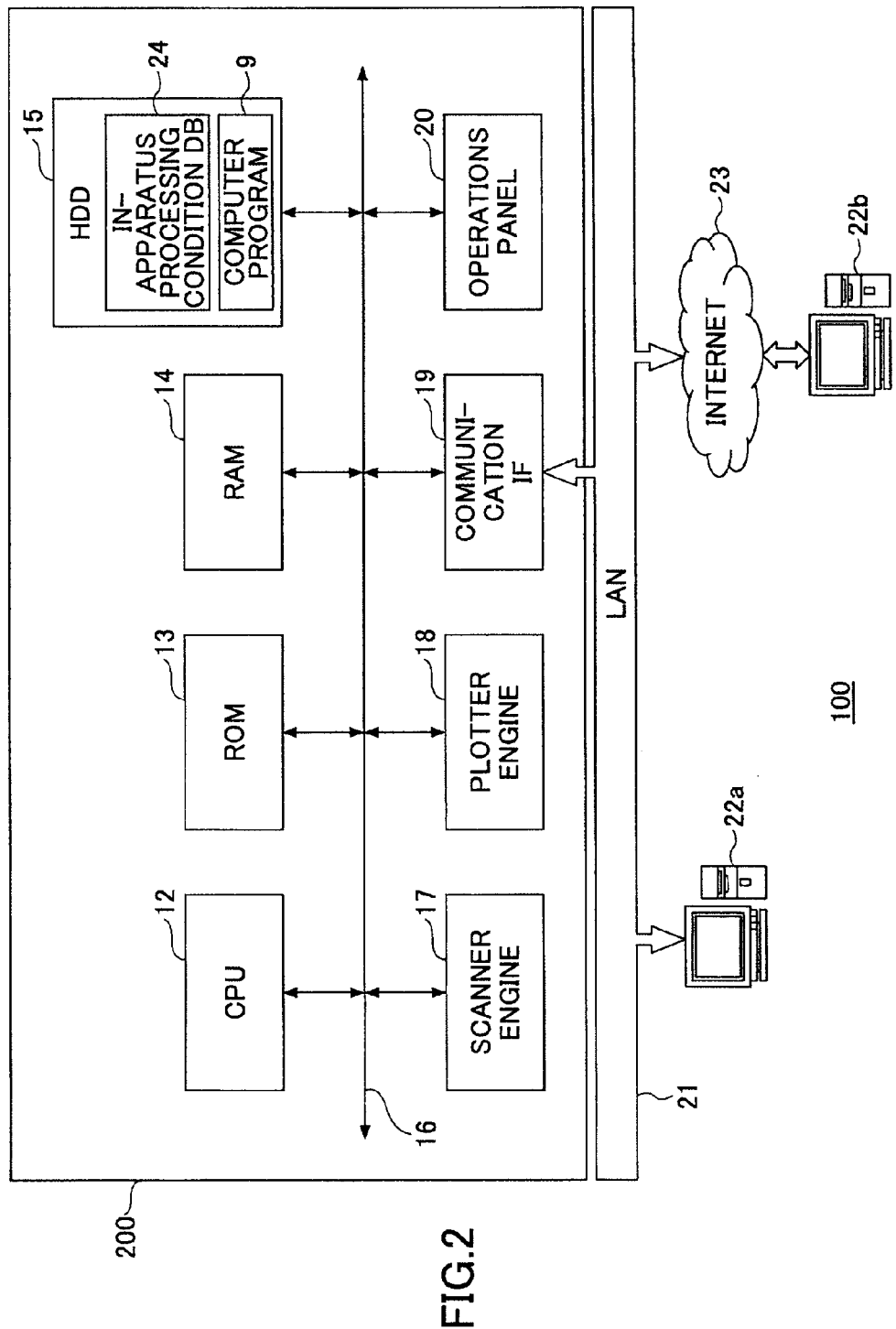
FIG. 2 is a diagram illustrating an example of a hardware configuration of an image forming apparatus in the image forming apparatus utilization system.

FIG. 2 illustrates an example of a hardware configuration of the image forming apparatus 200 in the image forming apparatus utilization system according to the embodiment.

The image forming apparatus 200 is electrically connected to a server 22a via a LAN 21 and also to a server 22b via the LAN 21 and the Internet. The servers 22a and 22b that store the processing conditions may be arranged so as to communicate with the image forming apparatus 200. The servers 22a and 22b are hereinafter called a "server 22". The server stores different processing conditions available to corresponding users.

The image forming apparatus 200 is a multifunctional peripheral (MFP) having functions as a printer, a scanner, and a facsimile machine, or at least one of these functions. The image forming apparatus 200 in the first embodiment is described as the MFP.

The image forming apparatus 200 includes a CPU 12, a ROM 13, a RAM 14, an HDD 15, an operations panel 20, a communication IF 19, a plotter engine 18, and a scanner engine 17, which are mutually connected via an internal bus 16. That is, the image forming apparatus 200 is configured to include an information processing apparatus having a configuration similar to a personal computer or a workstation to which hardware units including a plotter, a scanner, and a paper-feed mechanism are connected.

Figure 16:
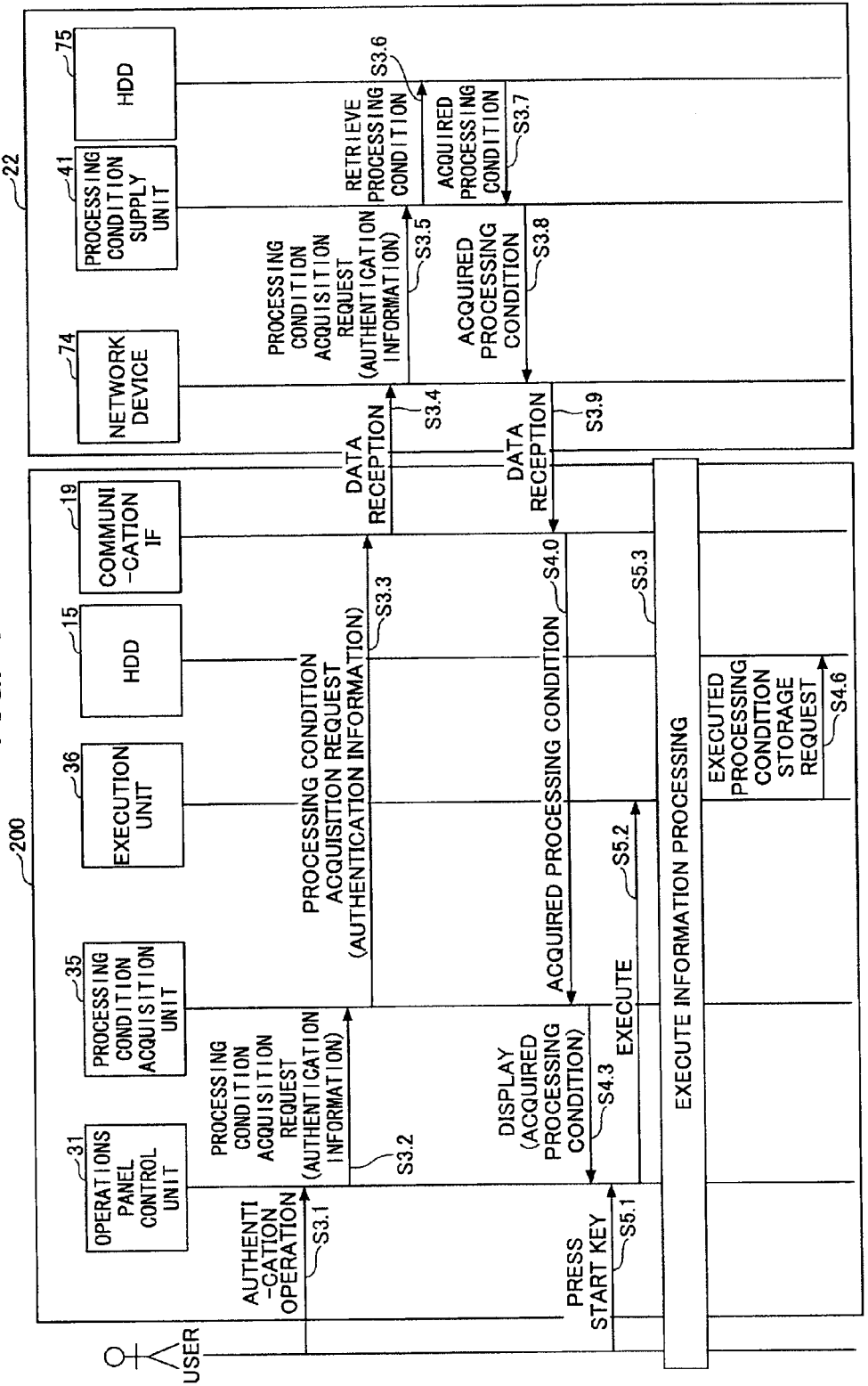
FIG. 16 is a sequence diagram illustrating another example of a procedure of setting of the processing condition obtained from the server in the image forming apparatus.

The CPU 12 is a control unit configured to control the image forming apparatus 200 as a whole, and executes various computer programs 9 recorded on a ROM 13 or the HDD 15 to implement respective functions of a processing condition acquisition unit 35 or an execution unit 36 (see FIG. 16). The ROM 13 is a volatile storage unit configured to store computer programs executed by the CPU 12, static data, or parameters. Note that the ROM 13 may be a rewritable storage unit such as a flash memory and may be configured such that the above computer programs, the static data or the stored parameters can be updated. The RAM 14 is a volatile storage unit such as a dual inline memory module (DIMM) configured to temporarily store data, or function as a working memory for the CPU 12.

The HDD 15 is configured to store various data such as the computer programs 9 executed by the CPU 12, data needing to be retained even if the apparatus has been switched off (e.g., font data and parameters of image processing), image data scanned by the scanner engine 17, and print data received from external information processing apparatuses via the communication interface (IF).

Specifically, in the first embodiment, the HDD 15 stores the processing condition acquired from the server 22 (first processing condition). In addition, the HDD 15 preliminarily stores an in-apparatus processing condition DB 24 configured to register various in-apparatus processing conditions (second processing conditions). Details of such various in-apparatus processing conditions are described later.

Note that other storage units such as a flash memory (e.g., Solid State Drive SDD) may be used as part of or all of the storage units such as the ROM 13 or the HDD 15. The operations panel 20 is a user interface configured to visually present various information items to users and includes a display configured to display various screens, a status of the image forming apparatus 200, and messages. The operations panel 20 also works as a user interface configured to further include a touch panel uniformly arranged on the display, and a hardware keyboard including a ten key (i.e., the number pad) and a start key arranged around the display so as to receive commands assigned by the user's operation.

The communication IF 19 is a communication device configured to enable the image forming apparatus 200 to communicate with the server 22 via the LAN 21 or the Internet 23. Since the communication IF 19 carries out communications based on TCP/IP protocols (i.e., TCP/IP suite), the communication IF 19 establishes communication connections of the physical layer and the data link layer with the server 22. The image forming apparatus 200 communicates with the server 22 based on a protocol such as a lightweight directory access protocol (LDAP), which is an upper layer protocol of the TCP/IP. The LDAP is a versatile protocol in directory services, which is used when a processing condition in the server 22 is searched for from the image forming apparatus 200.

The plotter engine 18 is a control unit configured to control a printer (i.e., plotter device). The printer forms images based on image data formed by the scanner engine 17 scanning an original image or print data acquired from the information processing apparatus and prints them on a recording sheet. Any type of printer may be used as the printer. An example of the printer is one configured to transfer a toner image formed on a photosensitive drum by an electrophotographic imaging process using a laser beam onto a recording sheet and fix the toner image on the recording sheet by the application of pressure and heat; or another example is a printer configured to form an image by causing a recording head having plural nozzle arrays to discharge droplets of different colors on the recording sheet while reciprocating over the recording paper.

The scanner engine 17 is a control unit configured to control a scanner device. The scanner device is configured to read light via a CCD reflected from the original image document on a reading stage or on a reading unit fed from an automatic document feeder (ADF), and carry out an AD conversion on the read light to form image data composed of pixels having pixel values.

The CPU 12 is configured to generate operational result data based on operational results obtained via the operations panel 20. The operational result data include items of the processing condition such as a document size, a resolution, and a color mode. The scanner engine 17 and the plotter engine 18 respectively acquire the operational result data from the CPU 12 to read the image and print the image on a recording sheet.

Figure 3:
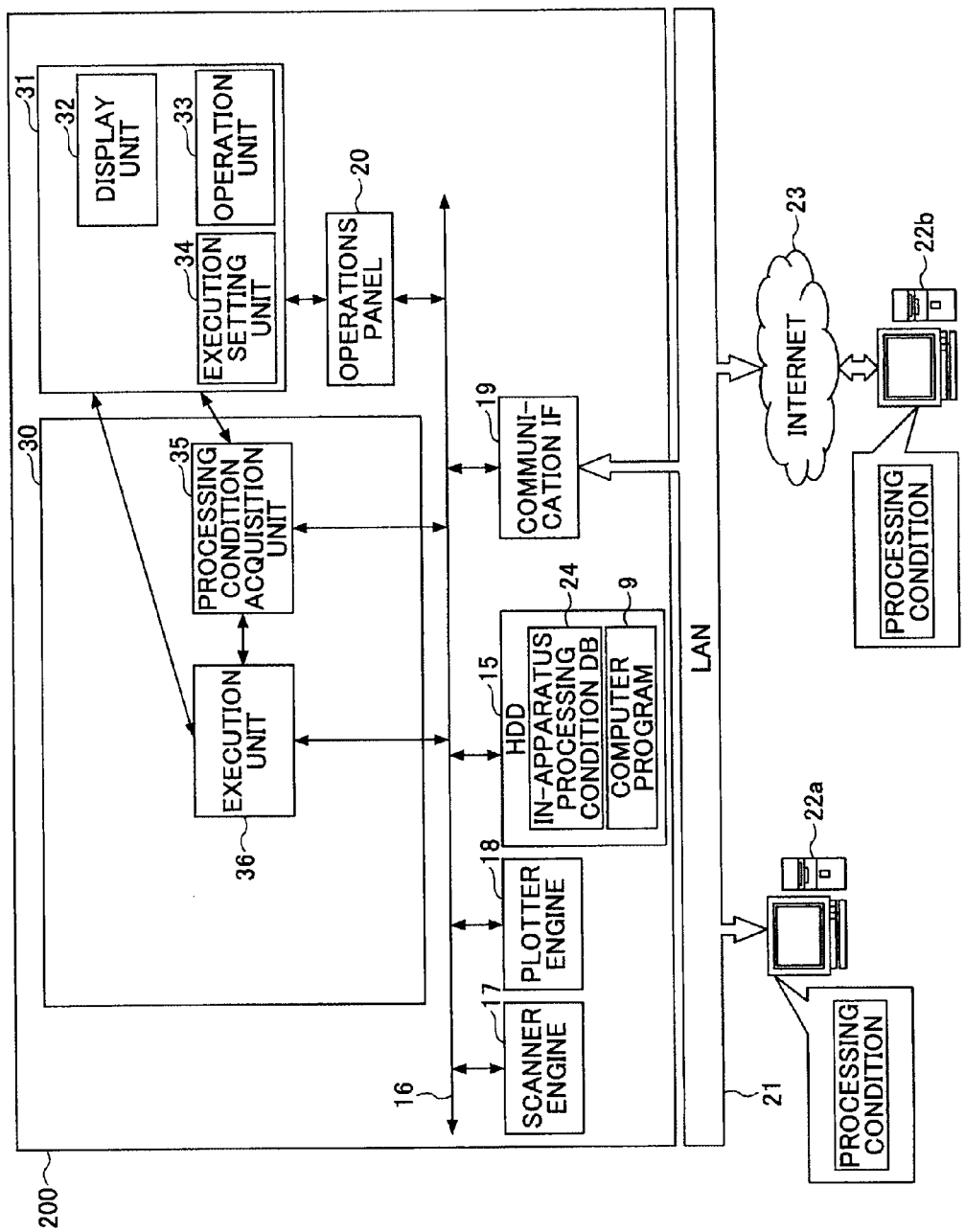
FIG. 3 is a functional block diagram illustrating an example of the image forming apparatus according to an embodiment of the invention.

Next, functions of the image forming apparatus 200 according to the first embodiment are described with reference to FIG. 3. FIG. 3 illustrates an example of a functional block diagram of the image forming apparatus 200 in the image forming apparatus utilization system 100 according to the first embodiment illustrated in FIG. 2. In FIG. 2, an operations panel control unit 31 is connected to the operations panel 20. Alternatively, the operations panel control unit 31 may be integrated with the operations panel 20. The operations panel control unit 31 includes a display unit 32, an execution setting unit 34, and an operations unit 33.

The display unit 32 is configured to render various screens on the display. More specifically, the display unit 32 is configured to form a screen based on screen definition information to define arrangements of various software keyboards. The display unit 32 is configured to refer to the screen definition information via the operations unit 33. The operations unit 33 is configured to notify, on detecting a pressed key of the hardware keyboard, the CPU 12 of the type of the pressed key (i.e., hardware keyboard), and likewise, the operations unit 33 is configured to notify the CPU 12 of the type of the pressed key (i.e., software keyboard), on detecting the pressed key of the software keyboard on the touch panel while referring to the image definition information. Accordingly, the CPU 12 may execute various processes based on the operations of the user.

The execution setting unit 34 defines an editable range of the processing condition authorized for a corresponding user. Specifically, the execution setting unit 34 defines one of the following editable ranges as the editable range of the processing condition granted to the corresponding user.

(1) A first editable range of the processing condition based on which the user carries out information processing includes both the processing condition that is received from the server 22 and is stored in the HDD (i.e., first processing condition) and the in-apparatus processing condition that is preliminarily stored in the HDD (i.e., second processing condition).

(2) A second editable range of the processing condition based on which the user carries out information processing includes only the processing condition that is received from the server 22 and stored in the HDD (i.e., first processing condition only).

The above first and second processing condition ranges may be set by the address addition setting screen 101 which is displayed when the administrator or the user presses an "initial system setting" key of the image forming apparatus 200 to display a screen having plural tabs and selects one of the tabs to display. FIG. 4A is a diagram illustrating an example of the address addition setting screen 101. The address addition setting screen 101 includes a "server-origin processing condition" button 102 and a "server-origin processing condition and address book" button 103. The execution setting unit 34 sets the second editable range to be the processing condition when the user selects and presses the "server-origin processing condition" button 102. The execution setting unit 34 sets the first editable range to be the processing condition when the user selects and presses the "server-origin processing condition and address book" button 103. The execution setting unit 34 stores flags corresponding to the first and second editable ranges in the RAM 14. The CPU 12 (i.e., processing condition acquisition unit 35) determines one of the first and second editing ranges as a target editable range (processing condition) to be retrieved from the HDD 15 by referring to the flags.

For example, when the first editable range is selected, the target editable range includes the in-apparatus processing condition preliminarily stored in the HDD 15 (i.e., second processing condition) in addition to the processing condition received from the server 22 and stored in the HDD 15 (i.e., first processing condition). Accordingly, the user editable range may be widened, thereby improving the usability of the image forming apparatus 200. By contrast, when the second editable range is selected, the target editable range is limited to the first processing condition registered in the server 22. Accordingly, the security level of the image forming apparatus 200 may be improved. As described above, the administrator or the user can select one of the first and second editable ranges based on whether the user would give priority to the usability or the security level of the image forming apparatus 200.

Note that the target editable range is not limited to the first and second editable ranges but may include other editable ranges excluding the above first and second editable ranges. FIG. 4B is another example of the address addition setting screen 101. As illustrated in FIG. 4B, the address addition setting screen 101 further includes a "server-origin processing condition and address book common setting" button 104 in addition to the "server-origin processing condition" button 102 and the "server-origin processing condition and address book" button 103. In the "server-origin processing condition and address book common setting" button 104, the editable range of the processing condition may be defined as follows.

(3) A third editable range of the processing condition based on which the user carries out information processing includes items of the processing condition received from the server 22 and stored in the HDD 15 (first processing condition) common to items of the in-apparatus processing condition preliminarily stored in the HDD 15 (second processing condition).

When the third editable range is selected, the target editable range of the processing condition is more stringently limited than those of the first and second ranges.

Referring back to FIG. 3, an application 30 indicates either an entity of a function obtained by the CPU 12's executing the computer programs 9 stored in the ROM 13 or the HDD 15, or the computer programs 9 themselves. The application 30 according to the first embodiment includes the execution unit 36 and the processing condition acquisition unit 35. Note that as the application 30, the image forming apparatus 200 according to the first embodiment includes a printer application, a photocopy application, a faxing application, a scanner application, a net filing application (i.e., document box application), and an Web application. The execution unit 36 and the processing condition acquisition unit 35 may be used via any of the above applications.

The processing condition acquisition unit 35 is configured to acquire a type of the pressed key of the hardware keyboard or the software keyboard that the user has pressed via the operations panel control unit 31 to generate operational result data based on the acquired type of the keyboard. As described above, the operational result data include the processing condition of the corresponding user. Specifically, the processing condition of the scanner application includes items such as the "resolution", "density setting", "color type", "paper size", "delivery method", and "delivery address". Further, the processing condition of the photocopy application includes items such as the "paper size", the "editing (aggregate/double side/bind)", and the "finishing (staple, punch, sort)". Such processing condition items are temporarily stored in the HDD 15.

The execution unit 36 executes, when detecting the pressing of a start key as a trigger, various computer programs including various control services, resource managers, and device drivers based on the operational result of the corresponding user. For example, when the user selects the scanner application, the execution unit 36 executes the scanning of a document by the user's pressing the start key. Note that the pressing of the start key is reported from the operations panel control unit 31 to the execution unit 36.

Further, the execution unit 36 stores the processing condition in the HDD 15. More specifically, execution unit 36 stores the processing condition in the HDD 15 after the user presses the "store" button on the operations panel 20 (in the first embodiment) or the start key (in the second embodiment).

There are three methods in which the execution unit 36 acquires the processing condition.

First method: includes a process in which the processing condition acquisition unit 35 acquires a processing condition transmitted by the user's operation to be stored in the HDD 15, and the execution unit 36 retrieves the processing condition acquired by the processing condition acquisition unit 35 from the HDD 15.

Second method: includes a process in which the processing condition acquisition unit 35 acquires a processing condition from the server 22 transmitted via the LAN 21 or the Internet 23, and the execution unit 36 receives the processing condition acquired by the processing condition acquisition unit 35 via the HDD 15 or the RAM 14.

Third method: includes a process in which the processing condition acquisition unit 35 acquires a processing condition from the server 22 transmitted via the LAN 21 or the Internet 23, a user edits the acquired processing condition, and the processing condition acquisition unit 35 transmits the edited processing condition to the execution unit 35 via the HDD 15 or the RAM 14. In the first embodiment, the third method is mainly described.

[Server]

Figure 5:
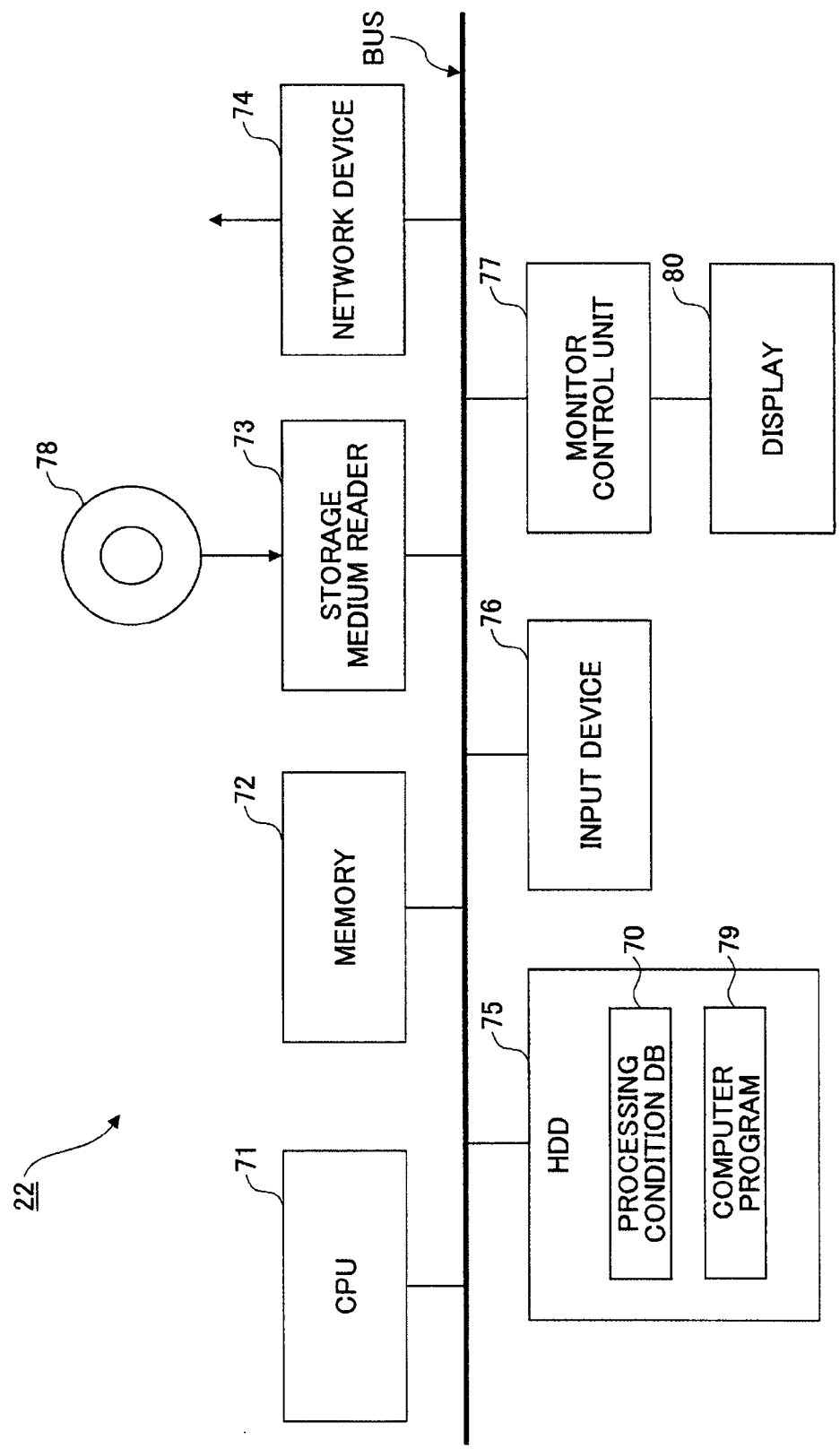
FIG. 5 illustrates an example of a hardware configuration of a server in the image forming apparatus utilization system.

First, functions of the server 22 according to the first embodiment are described with reference to FIG. 5. The server 22 is an information processing apparatus having a personal computer or a workstation as an entity of the server 22. The server 22 is configured to include a CPU 71, a memory 72, and a bus such that the CPU 71 and the memory 72 are connected via the bus. The bus is connected via predetermined interfaces to an HDD 75 used as a large-capacity storage, an input device 76 including a mouse and a keyboard, a monitor control unit 77 to which an LCD or CRT display 80 is connected, a storage medium reader 73 configured to read the storage medium 78 such as an optical disk, and a predetermined network device 74 including networks such as the Internet 23 or a USB configured to communicate with external devices. The HDD 75 of the server 22 stores a computer program 79 configured to transmit a processing condition to the image forming apparatus 200. The computer program 79 is either read by the storage medium reader 73 from the storage medium 78 or is downloaded from the network such as the Internet 23 and installed in the HDD 75. The CPU 71 of the server 22 retrieves the computer program 79 stored in the HDD 75, loads the retrieved computer program 79 in the RAM of the memory 72 used as the working memory, and executes the loaded computer program 79, thereby implementing a processing condition supply unit 41 (see FIG. 7). The HDD 75 of the server 22 also stores a processing condition DB 70. Processing conditions registered in the processing condition DB 70 are described later.

Since the network device 74 carries out communications based on TCP/IP protocols (i.e., TCP/IP suite), the network device 74 establishes communication connections of the physical layer and the data link layer with the server 22. Note that in the first embodiment, the image forming apparatus 200 and the server 22 are configured to be separate entities; however, the functions of the server 22 may be integrated in the image forming apparatus 200 to be a single entity. In this case, accessibility of resources or the functions of the server 22 may be limited to administrators, so that users of the image forming apparatus 200 may not have access to the resources and functions of the server 22.

Figure 6:
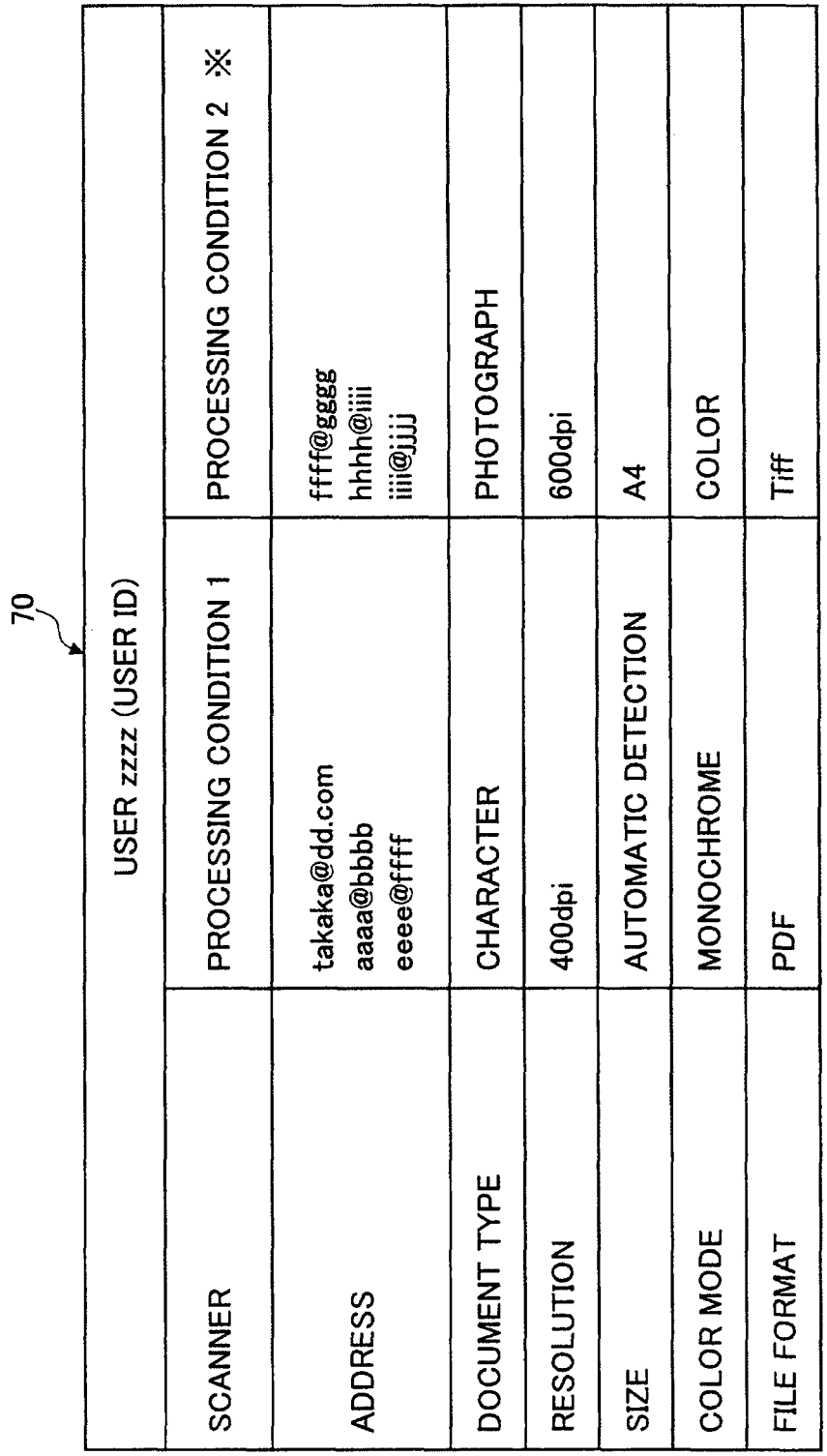
FIG. 6 is a schematic diagram illustrating an example of a processing condition stored in a processing condition DB of the server.

Next, the processing conditions are described with reference to FIG. 6. FIG. 6 is a schematic diagram illustrating an example of the first processing condition composed of processing condition 1 and processing condition 2 stored in the processing condition DB 70 of the server 22. The processing conditions 1 and 2 are registered based on users and different functions of the application 30. The first processing condition composed of the processing conditions 1 and 2 illustrated in FIG. 6 is that for the scanner application. However, the processing condition DB 70 of the server 22 may register the first processing condition composed of the processing conditions 1 and 2 for other applications such as the printer application, the photocopy application, the faxing application, and the net filing application.

The processing conditions 1 and 2 of the scanner application each includes items such as "address", "document type", "resolution", "size", "color mode", and "file format". For example, in the processing condition 1 of the scanner application, the "address" includes "taka@dd.com, aaaa@bbbb, eeee@ffff", the "document type" is a "character" type, the "resolution" is "400 dpi", the "size" is an "automatically detected" type, the "color mode" is "monochrome", and the "file format" is a "PDF". As described above, plural items of the processing condition 1 are registered based on different users and different types of the application 30.

Note that an asterisk mark "*" marked on the right the "processing condition 2" indicates that users of the image forming apparatus 200 are unable to edit the processing condition 2 of the image forming apparatus 200. In the example of FIG. 6, the "processing condition 1" is editable by the users while the "processing condition 2" is uneditable by the users. Such editability of the processing conditions 1 or 2 is configured by the later-described administrator.

When the image forming apparatus 200 receives the processing condition 1 or 2 from the server 22, the execution unit 36 sets corresponding values of the "resolution", the "density setting", the "color type", and the "paper size" as parameters to activate the scanner function. Accordingly, the image forming apparatus 200 is capable of reading a document to generate image data without the user's operation of the operations panel 20 of the image forming apparatus 200.

The processing condition 1 or 2 is registered in the server 22 by the administrator. The following is a brief description of the registration of the processing condition 1 or 2. The administrator is allowed to login to terminals that can communicate with the server 22, and registers the processing condition 1 or 2 by operating a terminal using the following procedure as an example. Note that the server 22 may be configured to be integrated with the terminal.

First registration: The terminal includes a user interface called a "scanner manager console" that is implemented as a function or application software of a specific OS (e.g., an OS having a function equal to Windows (registered trademark) VISTA, 7 or later). The scanner manager console is one of user interfaces for the administrator to communicate with the image forming apparatus 200 and the server 22, or to set various information items in the image forming apparatus 200 and the server 22. The terminal communicates with the image forming apparatus 200 based on a predetermined protocol such as a WS-EWS.

In order to create a processing condition, capability information of the image forming apparatus 200 including color readability, the value of the maximum resolution, and the like is registered. The terminal receives queries about the capability information or the status of the image forming apparatus 200 transmitted by the administrator's operation to transmit the queries to the image forming apparatus 200.

Second registration: When the terminal requests the image forming apparatus 200 to provide the capability information of the image forming apparatus 200, the image forming apparatus 200 supplies its capability information to the terminal upon request. Note that the terminal may receive the capability information of the image forming apparatus 200 either before the administrator creates the processing condition or at a time when the administrator is about to create a processing condition.

The terminal displays the capability information received from the image forming apparatus 200 on a display. The administrator is allowed to register a reading setting within a range of the received capability information. The administrator registers a delivery setting including a user name and a password of a user who carries out the processing based on the above reading setting.

Third registration: The terminal transmits the processing condition including various registered information items to the server 22. The server 22 saves (stores) the transmitted processing condition by making a connection between the transmitted processing condition and a user ID so that the user can identify the connection. The server 22 administers a PC, a scanner, a printer, a copier, a facsimile machine, and the like connected to plural networks as a hierarchical structure of a domain (administration unit of user and computer). For example, a group of image forming apparatuses that can be connected to the server 22 may be defined. So far, a procedure of registering the processing condition has been described.

Note that in the above example, the processing conditions for one image forming apparatus 200 are generated and registered in the server 22 by the administrator's operation of the terminal. However, once a processing condition for one image forming apparatus 200 is generated by the administrator's operation of the terminal, the terminal may apply the generated processing condition to other image forming apparatuses 200 . . . that have supplied their capability information to generate new processing conditions for those image forming apparatuses 200 . . . . That is, if one processing condition for one image forming apparatus 200 is registered in the server 22, such a processing condition may automatically be registered in the server 22 corresponding to other image forming apparatuses 200 . . . having similar capabilities.

Figure 7:
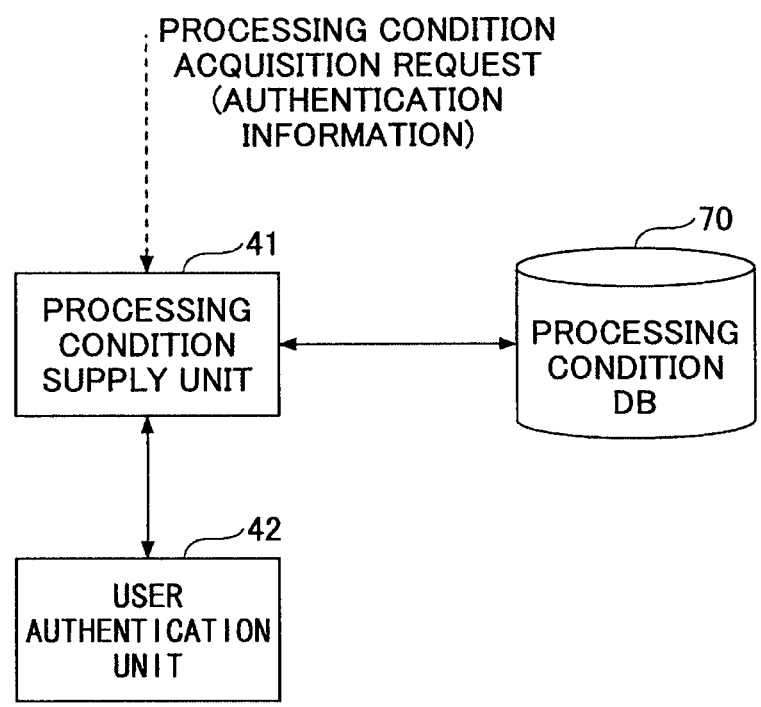
FIG. 7 is a functional block diagram illustrating an example of the server.

FIG. 7 is a functional block diagram illustrating an example of the server 22. The processing condition supply unit 41 is connected to the processing condition DB 70 and a user authentication unit 42. A processing condition supply unit 41 receives authentication information from the image forming apparatus 200. The authentication information is composed of a user ID and a password of a user. The image forming apparatus 200 transmits to the server 22 the processing condition together with a processing condition acquisition request. On receiving the authentication information from the image forming apparatus 200, the processing condition supply unit 41 transmits the received authentication information to the user authentication unit 42. The user authentication unit 42 determines whether to authenticate the user based on the authentication information (i.e., user ID and password combination of the user) registered in an authentication information DB (not shown), and transmits the determined result to the processing condition supply unit 41.

If the processing condition supply unit 41 receives the determined result indicating that the authentication of the user has succeeded, the processing condition supply unit 41 retrieves a processing condition from the processing condition DB 70 corresponding to the user ID by searching for the processing condition corresponding to the user ID in the processing condition DB 70 with the user ID as a key. If there are plural processing conditions corresponding to the user ID, the processing condition supply unit 41 retrieves all the processing conditions corresponding to the user ID registered in the processing condition DB 70 of the server 22. Alternatively, when information on the type of the application 30 for the processing conditions is included in advance in the processing condition acquisition request, the processing condition supply unit 41 retrieves the processing conditions for a corresponding application 30 only based on the information on the type of the application 30 in the processing condition acquisition request. The processing condition supply unit 41 transmits all the processing conditions retrieved from the processing condition DB 70 to the image forming apparatus 200.

[In-Apparatus Processing Condition]

Next, the in-apparatus processing condition (i.e., second processing condition) is described with reference to FIGS. 8A and 8B. FIGS. 8A and 8B are diagrams illustrating examples of in-apparatus information processing conditions stored in the in-apparatus processing condition DB 24. The in-apparatus processing condition has information comparable to the processing condition registered by the administrator in the image forming apparatus 200. The "comparable" indicates that the information of the processing condition registered by the administrator in the image forming apparatus 200 is not necessarily identical to that of the in-apparatus processing condition preliminarily stored in the image forming apparatus 200. The in-apparatus processing condition may be stored in any arrangement (e.g., based on processing condition type, and items of processing condition). However, in the first embodiment, the user edits the processing condition based on the in-apparatus processing condition, so that the in-apparatus processing conditions are classified into and stored based on the classified items.

FIG. 8A illustrates an example of an address item (information) that is one of the items constituting the in-apparatus processing condition. Since the address item of the in-apparatus processing condition has the same format as the format of an address book, the address book is used as the address item of the in-apparatus processing condition in the first embodiment. The address book in this embodiment is composed of a user item, an address item, and a processing condition number item. FIG. 8A illustrates an example of the address book in the first embodiment including the "processing condition number item" in addition to the "user item" and the "address item" of the related art address book. Note that the "processing condition number item" includes an identification number to identify a source (origin) of the processing conditions such as a server origin or an apparatus origin.

The "user item" includes information to identify an address of a user, a user's ID, and a user name to identify the users of the image forming apparatus 200. The "address" item includes destinations to which the image data are transmitted, such as email addresses and facsimile numbers. The administrator (may be the same or different administrator of the server 22) inputs data in the address book illustrated in FIG. 8A via the operations panel of either the image forming apparatus 200 or the server 22 (not shown). Thus, if the destinations (i.e., address) are those registered in the address book, there is little risk of information leakage during the transmission of the image data. As illustrated in FIG. 8A, if the addresses are registered by the administrator, "-" is registered in the processing condition number item of the address book.

By contrast, FIG. 8B is a diagram illustrating an example of the address book including several addresses registered via the processing conditions originally obtained from the server 22 in addition to the addresses of the in-apparatus processing condition registered by the administrator. As illustrated in FIG. 8B, in such addresses registered via the processing conditions originally obtained from the server 22, information such as a numeric value other than "-" is registered in the processing condition number item of the addresses of the address book. Thus, whether an address is obtained from the in-apparatus processing condition registered by the administrator or obtained from the processing condition originally obtained from the server 22 may be determined by referring the "processing condition number" item of the address book. Thus, although the addresses obtained from the in-apparatus processing condition and obtained from the processing conditions originally obtained from the server 22 are mixed in one address book, they are identifiable from one another. Note that the address book illustrated in FIG. 8B is only an example of the address book of a mixed processing condition composed of the processing condition obtained from the in-apparatus processing condition (i.e., second processing condition) and the processing condition originally obtained from the server 22 (i.e., first processing condition); however, these first and second processing conditions may be registered in separate databases.

FIGS. 9A through 9E illustrate corresponding examples of the "document type", the "resolution", the "size", the "color mode", and "file format" items of the in-apparatus processing condition (i.e., second processing condition) and the processing condition originally obtained from the server 22 (i.e., first processing condition). Similar to the address book, "-" is registered in the processing condition number item corresponding to the "document type", the "resolution", the "size", the "color mode", and the "file format" of the in-apparatus processing condition preliminarily registered in the image forming apparatus 200 by the administrator. These items of the in-apparatus processing condition, differing from the address item, are unique to the image forming apparatus 200, and therefore they are not necessarily registered in the image forming apparatus 200 by the administrator. That is, if the image forming apparatus 200 is specified, setting ranges of the "document type", the "resolution", the "size", the "color mode", and the "file format" are automatically determined. However, the administrator might want to limit the user's access to full functions of the image formation device 200. For example, document reading in color mode generally increase a file size, and the administrator might want to basically limit the user's access to the color mode function of the image forming apparatus 200. Accordingly, the administrator preliminarily registers the in-apparatus processing condition having the processing condition number of "-" as illustrated in FIGS. 9A through 9E in the image forming apparatus 200.

As described above, the image forming apparatus 200 receives the processing condition from the server 22 and registers the received processing condition (hereinafter also called "server processing condition" for convenience, that is also the "first processing condition") in addition to the in-apparatus processing condition preliminarily registered in the image forming apparatus 200. As a result, the number of executable processing conditions may be increased. However, the processing conditions are registered in the server 22 based on users and therefore these processing conditions are authorized by the administrator. Accordingly, the processing conditions registered in the server 22 are often overlapped with or are included in the in-apparatus processing conditions preliminarily registered in the image forming apparatus 200. Further, the processing conditions transmitted from the server generally include larger capability settings than in-apparatus processing condition. For example, the resolution in the server processing condition is "600 dpi" but the resolution in the in-apparatus processing condition is "300 dpi", the color mode in the server processing condition is "color" but the color mode in the in-apparatus processing condition is "monochrome". Accordingly, the user is allowed to edit the server processing condition received from the server 22 in the image forming apparatus 200 based on the in-apparatus processing condition.

When the server processing condition received from the server 22 is registered in the image forming apparatus 200, the execution unit 36 determines whether the contents of the "address", the "document type", the "resolution", the "size", the "color mode", and the "file format" items are overlapped with the corresponding items of the in-apparatus processing condition of the image forming apparatus 200. If the contents of the "address", the "document type", the "resolution", the "size", the "color mode", and the "file format" items of the server processing condition are not overlapped with the corresponding items of the in-apparatus processing condition, the image forming apparatus 200 registers such items of the server processing condition originally received from the server 22 in the in-apparatus processing condition.

Note that the "overlapped" not only indicates the content of the item being the same as the content of the corresponding item of the in-apparatus processing condition, but also indicates the processing condition number of the server processing condition received from the server 22 being the same as the processing condition number not registered as the in-apparatus processing condition, or indicates at least the processing condition number of the server processing condition received from the server 22 being the same as the processing condition number not registered as the in-apparatus processing condition having the processing condition number of "-". In the former example, the document type item of "character" with the processing condition number of "-" is not determined as the same as (overlapped with) the document type item of "character" with the processing condition number of "1". In this case, the document type item of "character" with the processing condition number of "-" and the document type item of "character" with the processing condition number of "1" are registered in the in-apparatus processing condition as different document type items. The document types having the processing condition number of "-" and the processing condition number of "1" are registered as different document types in order to switch the first and second editable ranges.

[Procedure of Setting Processing Condition in Image Forming Apparatus 200]

Next, a procedure of setting the server processing condition in the image forming apparatus 200 is described with reference to FIG. 10. The user inputs authentication information by operating the operations panel 20 (Step S3.1). The authentication information may be input to the image forming apparatus 200 by any kind of operation method, examples of which include a method in which the user operates the operations panel 20 to input the user ID and password combination to the image forming apparatus 200, or a method in which the user causes the image forming apparatus 200 to read his or her IC card to input the user ID and password combination to the image forming apparatus 200.

The operations panel control unit 31 receives the authentication information of the user via a user ID and password registration screen or the IC card. The operations panel control unit 31 transmits the processing condition acquisition request including the authentication information to the processing condition acquisition unit 35 (Step S3.2). The processing condition acquisition unit 35 requests the communication IF 19 to transmit the processing condition acquisition request including the authentication information to the server 22 (Step S3.3). Note that the image forming apparatus 200 preliminarily registers an IP address and a MAC address of the server 22. The communication IF 19 transmits the processing condition acquisition request including the authentication information to the server 22 (Step S3.4).

On receiving the processing condition acquisition request including the authentication information, the network device 74 of the server 22 transmits the processing condition acquisition request including the authentication information to the processing condition supply unit 41 (Step S3.5). If the processing condition supply unit 41 transmits the authentication information to the user authentication unit 42 and a user authentication succeeds, the processing condition supply unit 41 retrieves (Step 3.6) a processing condition corresponding to the user ID from the processing condition DB 70 by searching for the processing condition corresponding to the user ID in the processing condition DB 70 with the user ID as a key, thereby acquiring the processing condition corresponding to the user ID (Step 3.7). The processing condition acquisition unit 41 then requests the network device 74 to transmit the retrieved (acquired) processing condition to the image forming apparatus 200 (Step S3.8). The network device 74 transmits the retrieved (acquired) processing condition to the image forming apparatus 200 (Step S3.9).

Figure 11A:
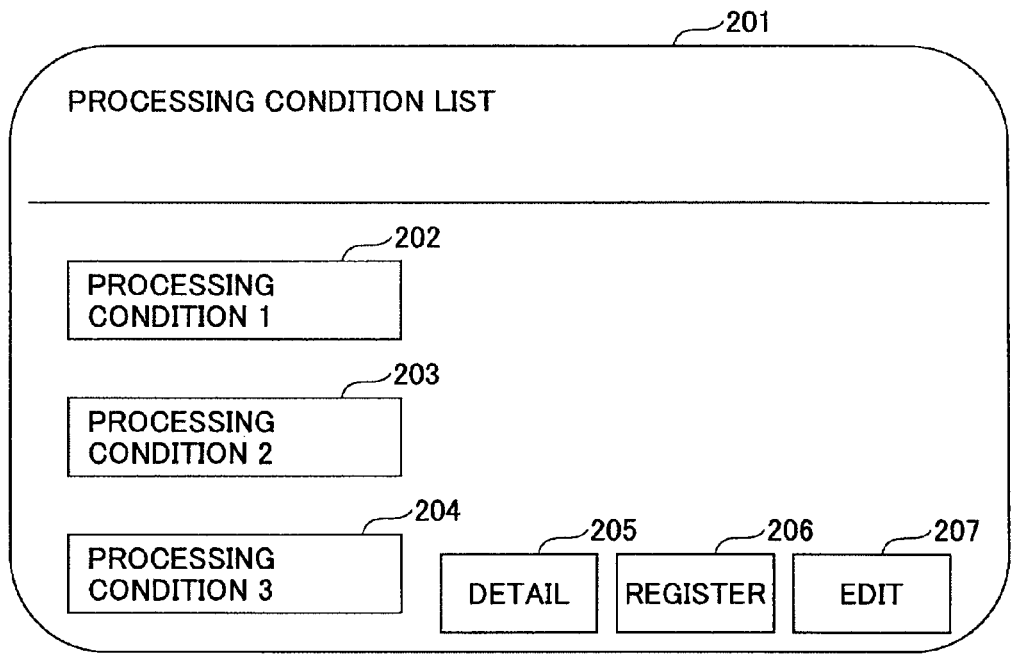
FIGS. 11A, 11B, and 11C are diagrams illustrating examples of transition of screens for setting the processing condition obtained from the server in the image forming apparatus.

On receiving the retrieved (acquired) processing condition, the communication IF 19 of the image forming apparatus 200 transmits the retrieved (acquired) processing condition to the processing condition acquisition unit of the image forming apparatus 200 (Step S4.0). The processing condition acquisition unit transmits the retrieved (acquired) processing condition to the operations panel control unit 31 (Step S4.3). The display unit 32 of the operations panel control unit 31 displays a processing condition list screen 201 including predetermined screen definition information and the processing conditions with corresponding numbers. FIG. 11A is a diagram illustrating an example of the processing condition list screen 201 displaying a list of processing conditions. The processing condition list screen 201 includes "processing condition n (n=processing condition number)" buttons 202 through 204, a "detail" button 205, a "register" button 206, and an "edit" button 207. When the user presses one of the processing condition n buttons 202 through 204, the exclusively pressed one of the processing condition buttons 202 to 204 is highlighted. When the user presses the "detail" button 205 while the pressed one of the processing condition buttons 202 to 204 remains highlighted, the display unit 32 displays the details of the selected processing condition n. Further, when the user presses the "register" button 206 while the pressed one of the processing condition buttons 202 to 204 remains highlighted, the execution unit 36 registers the selected processing condition n in the HDD 15. Moreover, when the user presses the "edit" button 207 while the pressed one of the processing condition buttons 202 to 207 remains highlighted, the display unit 32 displays an editing screen 401 (see FIG. 13A) corresponding to the pressed one of the processing condition buttons 202 to 204.

Figure 11B:
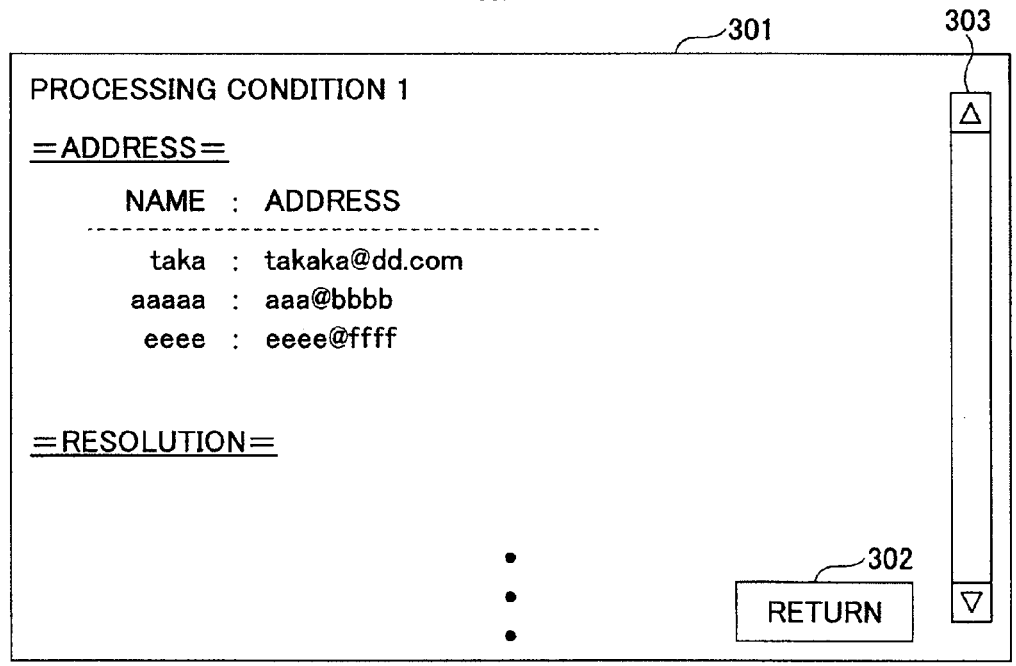
Figure 11C:
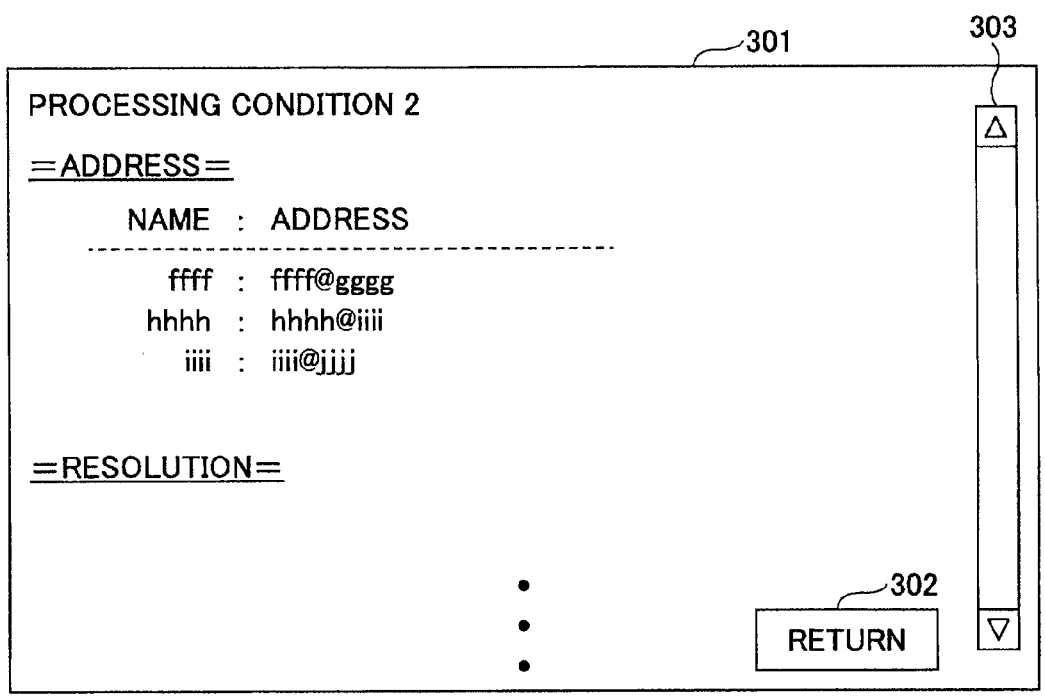

FIGS. 11B and 11C are examples of a processing condition detail screen 301 displayed on an operations screen when the user presses the "detail" button 205. FIG. 11B illustrates the example of the processing condition detail screen 301 when the processing condition 1 is selected, and FIG. 11C illustrates the example of the processing condition detail screen 301 when the processing condition 2 is selected. As illustrated in the address item of the processing condition 1 in FIG. 6, "takaka@dd.com", "aaaa@bbbb", and "eeee@ffff" are displayed in the address item of the processing condition 1 in FIG. 11B. The display unit 32 displays the "document type", the "resolution", the "size", the "color mode", and the "file format" items of the processing condition 1 when the user operates a scroll bar 303 on the right of the processing condition detail screen 301.

Likewise, as illustrated in the address item of the processing condition 2 in FIG. 6, "ffff@gggg", "hhhha@iiii", and "iiii@jjjj" are displayed in the address item of the processing condition 2 in FIG. 11C. The display unit 32 displays the "document type", the "resolution", the "size", the "color mode", and the "file format" items of the processing condition 2 when the user operates a scroll bar 303 on the right of the processing condition detail screen 301.

As illustrated in FIGS. 11B and 11C, when the user presses a "return" button 302 in the processing condition detail screen 301, the operations unit 33 receives a return command to cause the display unit 32 to display the processing condition list screen 201 illustrated in FIG. 11A.

Figure 13A:
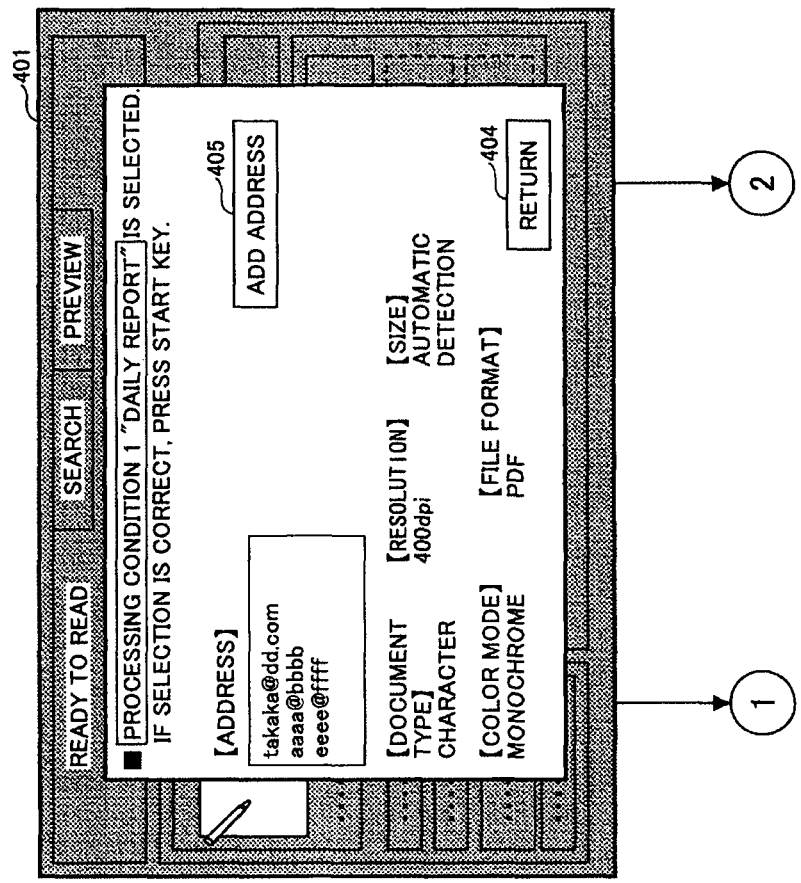
FIGS. 13A through 13C are diagrams illustrating examples of transition of screens for setting the processing condition.

FIG. 13A illustrates an example of the editing screen 401 displayed when the user presses the "edit" button on the processing condition list screen 201 illustrated in FIG. 11A. Details of the editing screen 401 will be described later.

Referring back to FIG. 10, when the user verifies the details of the processing condition 1 or 2 on the processing condition detail screen 301 of FIG. 11B or 11C, returns to the processing condition list screen 201, and presses the "register" button 206 on the processing condition list screen 201 of FIG. 11A, the operations panel control unit 31 receives a "register" command transmitted by the pressing of the "register" button 206 (Step S4.4). The operations panel control unit 31 requests the execution unit 36 to store the processing condition selected by the user (Step S4.5). The execution unit 36 acquires the selected processing condition and the storage request and stores the selected processing condition in the HDD 15 (Step S4.6).

For example, the addresses "takaka@dd.com", "aaaa@bbbb", and "eeee@ffff" contained in the address item of the processing condition 1 are stored in the address book of the image forming apparatus 200. The execution unit 36 also stores the processing condition number (e.g., process condition number of 1) in the HDD 15 while storing items (e.g., address item) of the processing condition. By storing the process condition number of the corresponding processing condition, the origins of the items of the processing conditions are clarified.

[Editing Procedure Based on in-Apparatus Processing Condition]

Figure 12:
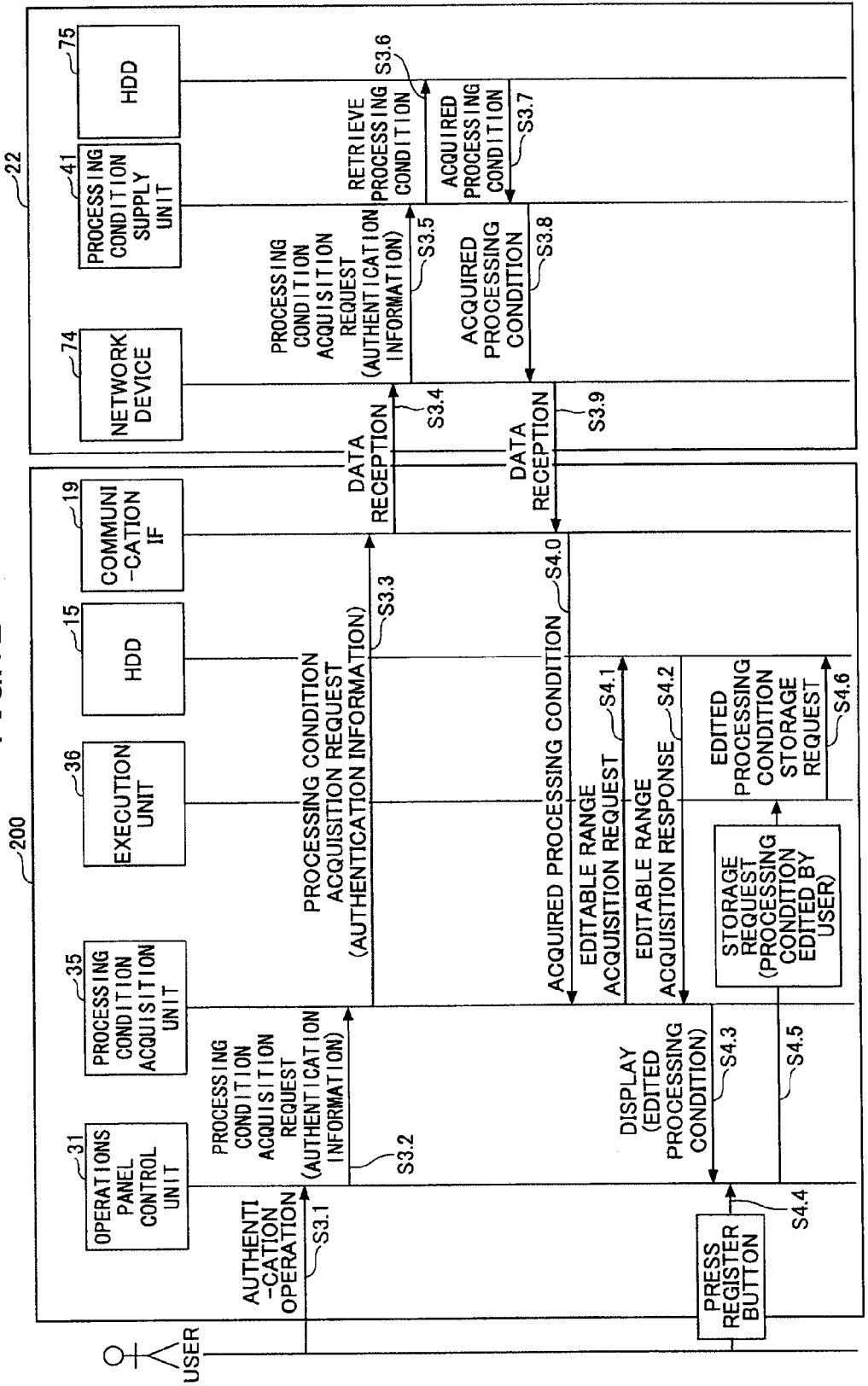
FIG. 12 is a sequence diagram illustrating an example of a procedure for a user to edit the processing condition obtained from the server based on the in-apparatus processing condition.

FIG. 12 is a sequence diagram illustrating another example of a procedure for the user to edit the processing condition acquired from the server 22 within the first or second editable range described above based on the in-apparatus processing condition. These kinds of editing may be possible insofar as they are not restricted by the image forming apparatus 200. In practice, the sequence diagram illustrated in FIG. 12 is integrated with the sequence diagram illustrated in FIG. 10.

In FIG. 12, a procedure in which the user logs into the image forming apparatus 200 and the execution unit 36 acquires the processing condition from the server 22 is the same as that illustrated in FIG. 10, and therefore, its description is omitted.

In step 4.0, the processing condition acquisition unit 35 acquires the processing condition via the communication IF 19 from the server 22 (Step S4.0). Then, the processing condition acquisition unit 35 retrieves the "processing condition acquired from the server 22" or the "processing condition acquired from the server 22+in-apparatus processing condition" stored in the HDD 15 in order to edit the processing condition (Step S4.1).

Figure 15:
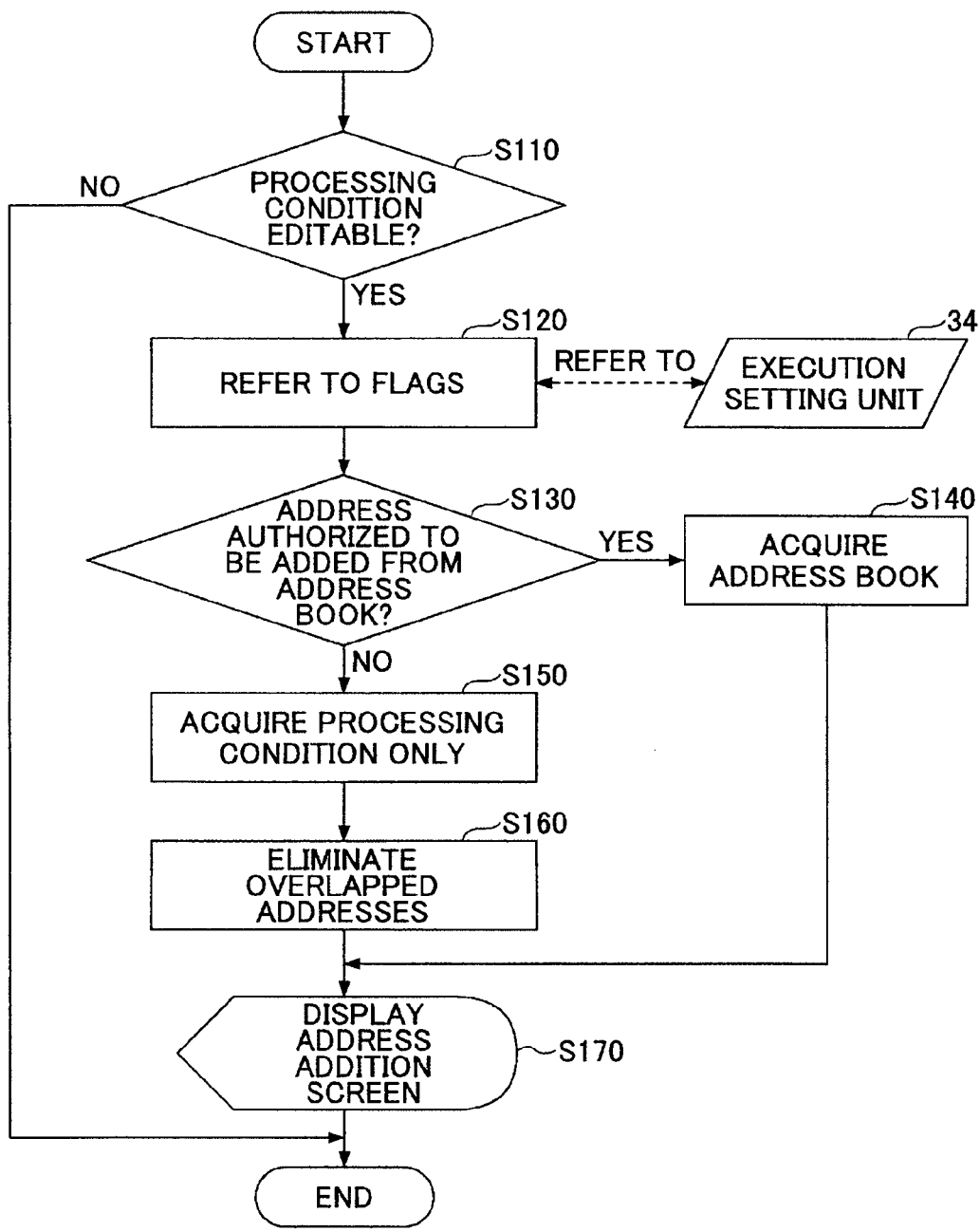
FIG. 15 is a flowchart illustrating an example of a procedure in which a processing condition acquisition unit determines an editable range.

As described above, the execution setting unit 34 specifies the editable range of the processing condition. That is, the execution setting unit 34 specifies either the first editable range, based on which the user is able to edit both the in-apparatus processing condition preliminarily stored in the HDD 15 of the image forming apparatus 200 and the processing condition acquired from the server 22 and stored in the HDD 15 of the image forming apparatus 200; or the second editable range, based on which the user is able to edit only the processing condition acquired from the server 22 and stored in the HDD 15 of the image forming apparatus 200. The processing condition acquisition unit 35 determines the editable range by retrieving flags set by the execution setting unit 34, and retrieves one of the "processing condition acquired from the server 22" and the "processing condition acquired from the server 22+in-apparatus processing condition" stored in the HDD 15 based on the determined editable range (Step S4.2). FIG. 15 is a flowchart illustrating such a procedure.

FIG. 13A is a diagram illustrating an example of the address addition setting screen 401. One of the "processing condition n" buttons 202 to 204 on the processing condition list screen 201 selected by the user is displayed on the editing screen 401 with the items of the selected processing condition n. FIG. 13A illustrates an example of the editing screen 401 when the processing condition 1 is selected. Further, an "add address" button 405 is displayed in the "address" item of the editing screen 401. The "add address" button 405 is used when the user desires to add another address to the addresses "takaka@dd.com, aaaa@bbbb, abd eeee@ffff" of the processing condition 1. That is, the user initiates editing the address item of the processing condition 1 by pressing the "add address" button 405.

FIG. 13A only shows the editing button in the address item; however, editing buttons are also displayed in other items.

When the user presses the "add address" button 405, the operations panel control unit 31 receives the "add address" command transmitted by the pressing of the "add address" button. Then, the operations panel control unit 31 displays the "processing condition acquired from the server 22" or the "processing condition acquired from the server 22+in-apparatus processing condition" stored in the HDD 15 retrieved by the processing condition acquisition unit 35. If the execution setting unit 34 sets an editable range as both the in-apparatus processing condition preliminarily stored in the HDD 15 of the image forming apparatus 200 and the processing condition received from the server 22 and stored in the HDD 15 of the image forming apparatus 200, the operations panel control unit 31 displays the addresses in the address book illustrated in FIG. 8B. More accurately, the addresses are obtained by eliminating the addresses in FIG. 13A (addresses contained in the processing condition received from server 22) that are overlapped with the addresses in the address book of FIG. 8B. The processing condition acquisition unit 35 retrieves all the addresses registered in the address book in FIG. 8B, eliminates overlapped addresses and transmits the resulting addresses to the operations panel control unit 31.

If the execution setting unit 34 sets an editable range as only the processing condition received from the server 22 and stored in the HDD 15 of the image forming apparatus 200, the operations panel control unit 31 displays the addresses having the processing condition number other than "-" of those of the address book (of the in-apparatus processing condition) in FIG. 8B. More accurately, the addresses are obtained by eliminating the addresses in FIG. 13A (addresses contained in the processing condition received from server 22) that are overlapped with the addresses having the processing condition number other than "-" of the address book of FIG. 8B.

FIG. 14 is a diagram illustrating an example of the addresses having the processing condition number other than "-" extracted from the address book of FIG. 8B. The processing condition acquisition unit 35 retrieves the address book illustrated in FIG. 14, eliminates overlapped addresses from the address book and transmits the resulting addresses to the operations panel control unit 31.

Figure 13B:
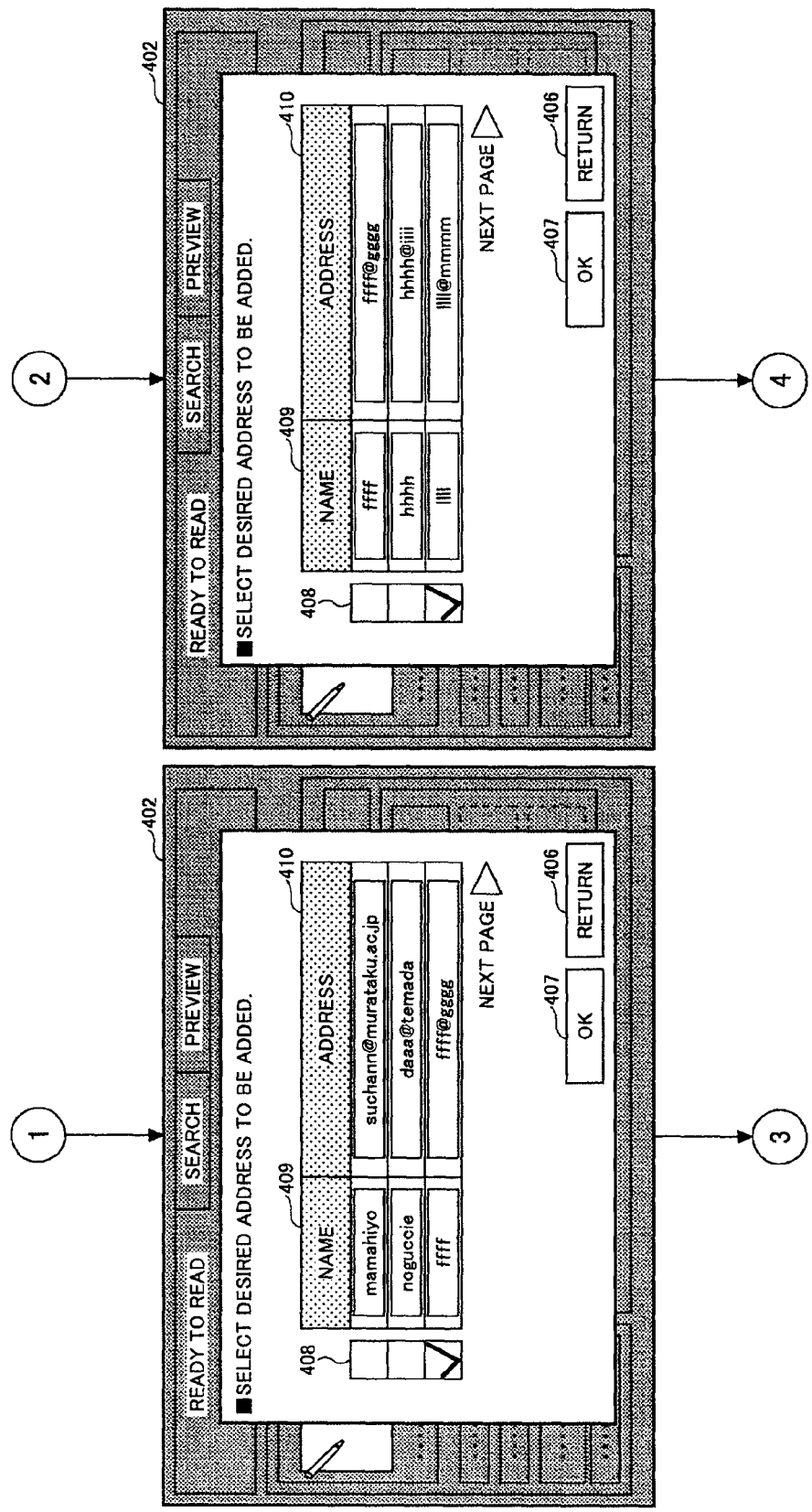

FIG. 13B illustrates examples of the address addition screen 402 displayed when the user presses the "add address" button 405. The address addition screen 402 includes a name item 409 (user ID or user name or nickname associated with user ID), an address item, and checkboxes 408.

A left side address addition screen 402 of FIG. 13B illustrates a case where the execution setting unit 34 sets the editable range as both the in-apparatus processing condition preliminarily stored in the HDD 15 of the image forming apparatus 200 and the processing condition received from the server 22 and stored in the HDD 15 of the image forming apparatus 200 (i.e., the first editable range). A right side address addition screen 402 of FIG. 13B illustrates a case where the execution setting unit 34 sets the editable range as only the processing condition received from the server 22 and stored in the HDD 15 of the image forming apparatus 200 (i.e., the second editable range).

As illustrated in FIG. 13B, addresses "suchann@murataku.ac.jp" and "daaa@temada" are not displayed on the right side address addition screen 402. That is, in a case where the execution setting unit 34 sets the editable range as only the processing condition received from the server 22 and stored in the HDD 15 of the image forming apparatus 200 (i.e., the second editable range), the user is unable to edit the in-apparatus processing condition.

The user checks the checkbook 408 corresponding to a desired address in the address addition screen 402. As illustrated in FIG. 13B, the checkbox corresponding to the address "ffff@gggg" is checked in the left side address addition screen 402 and the checkbox corresponding to the address "llll@mmmm" is checked in the right side address addition screen 402. The operations panel control unit 31 receives a command and displays the check in the checkbox 408. When the user presses the "OK" button 407 with the checkbox 408 being checked, the operations panel control unit 31 receives an add address command for the address with the check. The operations panel control unit 31 displays the editing screen 401 again with the added address 401.

Figure 13C:
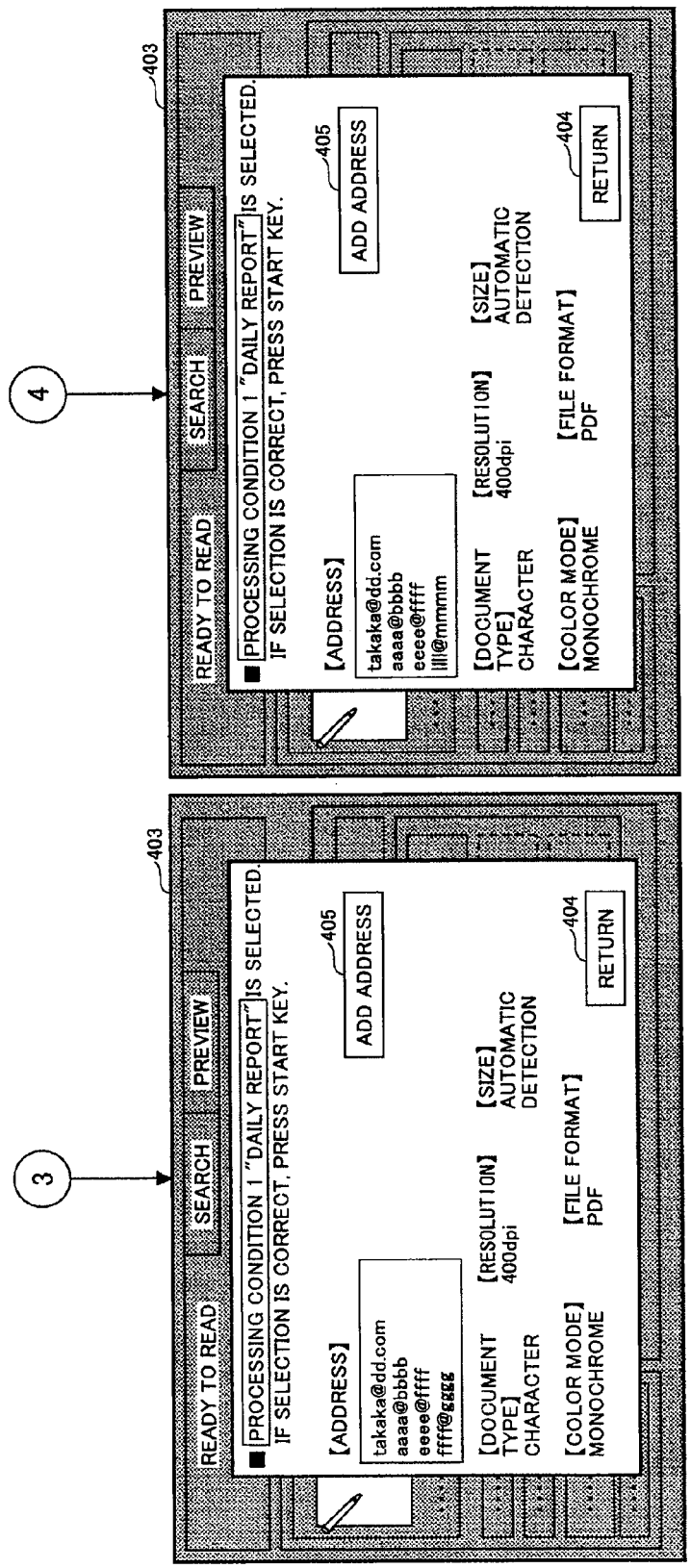

FIG. 13C illustrates the editing screen 401 (see FIG. 13A) with the added address as editing screens 403. As illustrated in FIG. 13C, the left side editing screen 403 is obtained when the address "ffff@gggg" is added in the left side address addition screen 402 in FIG. 13B, and the left side editing screen 403 is obtained when the address "llll@mmmm" is added in the right side address addition screen 402 FIG. 13B compared to the addresses displayed on the editing screen 401. When the user presses the "return" button 404, the operations panel control unit 31 receives a "return" command, and displays the processing condition list screen 201 illustrated in FIG. 11A.

Referring back to FIG. 12, when the user presses the "register" button 206 on the processing condition list screen 201 of FIG. 11A (Step S4.4), the operations panel control unit 31 receives a "register" command transmitted by the pressing of the "register" button 206. The operations panel control unit 31 adds the item (address) edited and added by the user to the processing condition selected by the user in FIG. 11A, and transmits the resulting processing condition to the execution unit 36 (Step S4.5). The execution unit 36 registers the processing condition including the added address edited by the user in the HDD 15 (Step S4.6). As described above, the execution unit 36 determines whether the "address", the "document type", the "resolution", the "size", the "color mode", and the "file format" information of the edited processing condition are not overlapped with the corresponding information items of the in-apparatus processing condition, and registers, if they are not overlapped, the information of the above items in the in-apparatus processing condition.

For example, when the user presses the "register" button 206, the operations panel control unit 31 displays an execution screen on which the user has set the edited items of the processing condition. Accordingly, after having registered the edited processing condition, the user presses the "start" key to carry out information processing based on the edited processing condition.

With the above processing, a new in-apparatus processing condition is stored in the HDD 15. Accordingly, the editable range may include the new in-apparatus condition when acquiring the processing condition from the server 22 next time. Note that insofar as the editable range is limited to the processing conditions received from the server and stored in the HDD, the editable range may not exceed a processing condition range set to the server 22 by the administrator. Accordingly, the security level of the image forming apparatus 200 is not degraded. In addition, even if the editable range includes both the in-apparatus processing condition that is preliminarily stored in the HDD and the processing condition that is received from the server 22 and is stored in the HDD, the in-apparatus processing condition is registered by the administrator and hence the security level of the image forming apparatus 200 may not be degraded so significantly. Therefore, in the first embodiment, the usability of the image forming apparatus can be improved while maintaining a certain security level thereof.

[Detailed Procedure in Determining Editable Range]

Referring to step S4.1 and S4.2 of FIG. 12, the procedure in which the processing condition acquisition unit 35 determines an editable range is described.

The flowchart of FIG. 15 starts when the processing condition acquisition unit 35 acquires a processing condition via the communication IF 19 from the server 22.

First, the processing condition acquisition unit 35 determines whether the processing condition (acquired from the server 22) is editable (Step S110). The processing condition acquisition unit 35 determines whether the processing condition (acquired from the server 22) is editable based on whether the processing condition in question has an asterisk mark "*". If the processing condition in question has an asterisk mark "*" and is therefore uneditable (No of S110), the process of the flowchart in FIG. 15 ends.

However, if the processing condition is editable (Yes of S110), the processing condition acquisition unit 35 refers to the flags set by the execution setting unit 34 (Step S120). As described above, the editable range is defined based on the flags.

The processing condition acquisition unit 35 determines whether the editable range includes adding an address from the address book (Step S130). Note that the "adding of an address from the address book" corresponds to "(1) the first editable range including both the in-apparatus processing condition that is preliminarily stored in the HDD and the processing condition that is received from the server 22 and is stored in the HDD".

If the "adding of an address from the address book" is authorized (Yes of S130), the processing condition acquisition unit 35 retrieves the address book stored in the HDD 15 (Step S140). Note that the address book includes the in-apparatus processing condition.

If the "adding of an address from the address book" is not authorized (No of S130), the processing condition acquisition unit 35 retrieves only the processing condition that is received from the server 22 and is stored in the HDD (Step S150).

Then, the processing condition acquisition unit 35 eliminates overlapped addresses between the addresses contained in the processing condition acquired from the server 22 and the addresses contained in the processing condition retrieved from the HDD 15" (Step S160). The processing condition acquisition unit 35 retrieves the addresses from the address book, eliminates overlapped addresses from the address book, and transmits the resulting addresses (remaining addresses) to the operations panel control unit 31.

As a result, the operations panel control unit 31 displays the address addition screen 402 illustrated in FIG. 13B (Step S170).

As described above, in the image forming apparatus utilization system 100 according to the first embodiment, since the processing condition received from the server 22 can be edited within a certain editable range, the usability of the image forming apparatus 200 may be improved while maintaining its certain security level. Further, since the editable range can be varied to a certain extent, the usability and the security level of the image forming apparatus 200 can be appropriately controlled.

Second Embodiment

In the first embodiment, the processing condition is registered by the pressing of the "register" button 206 in the image forming apparatus utilization system 100. However, in an image forming apparatus utilization system 100 according to a second embodiment, a processing condition received from the server 22 without being edited or an edited processing condition received from the server 22 is stored in the HDD 15 of the image forming apparatus 200 by executing the edited or pre-edited processing condition. With this configuration, the image forming apparatus 200 stores the processing conditions that are actually to be executed, and therefore the size of the storage required to hold in-apparatus processing conditions may be prevented from increasing. In addition, since the executed processing condition can be automatically registered in the image forming apparatus 200, the operations of the image forming apparatus 200 may be simplified.

Since a functional block diagram of the image forming apparatus 200 according to the second embodiment is similar to that of the image forming apparatus 200 according to the first embodiment illustrated in FIG. 3, its description is omitted. FIG. 16 is a sequence diagram illustrating an example of a procedure for setting the processing condition to the image forming apparatus 200 according to the second embodiment. Steps S3.1 through S4.0 in FIG. 16 are the same as the steps S3.1 through S4.0 in FIG. 10. On receiving the retrieved (acquired) processing condition from the server 22, the communication IF 19 of the image forming apparatus 200 transmits the retrieved (acquired) processing condition to the processing condition acquisition unit 35 of the image forming apparatus 200 (Step S4.0). The processing condition acquisition unit 35 transmits the retrieved (acquired) processing condition to the operations panel control unit 31 (Step S4.3). The display unit 32 of the operations panel control unit 31 displays a processing condition list screen 201 including predetermined screen definition information and the processing conditions with corresponding numbers.

As illustrated in FIG. 11A, in the second embodiment, the operations panel control unit 31 displays the processing condition list screen 201 in a similar manner to that of the first embodiment. When the user presses one of the "processing condition n" buttons 202 through 204, the exclusively pressed one of the processing condition buttons 202 to 204 is highlighted. When the user presses the "detail" button 205 while the pressed button remains highlighted, the display unit 32 displays the details of the selected processing condition n in the same manner as that of the first embodiment, which makes it possible for the user to verify the details of the selected processing condition n.

Moreover, when the user presses a "start" key of the hardware keyboard while a selected one of the "processing condition n" buttons 202 to 204 remains highlighted, the operations panel control unit 31 receives a "start" command transmitted by the pressing of the start key (Step S5.1). The operations panel control unit 31 requests the execution unit 36 to execute the selected one of the "processing condition n"

(Step S5.2). The processing condition acquisition unit 36 sets the selected processing condition as parameters to execute information processing (Step S5.3). That is, the image forming apparatus 200 reads a document to generate image data by setting the "address", the "document type", the "resolution", the "size", the "color mode", and the "file format" information of the selected processing condition as respective parameters.

When the execution unit 36 finishes the information processing based on the selected processing condition, the execution unit 36 registers the selected processing condition in the HDD 15 based on the above information items.

Figure 17:
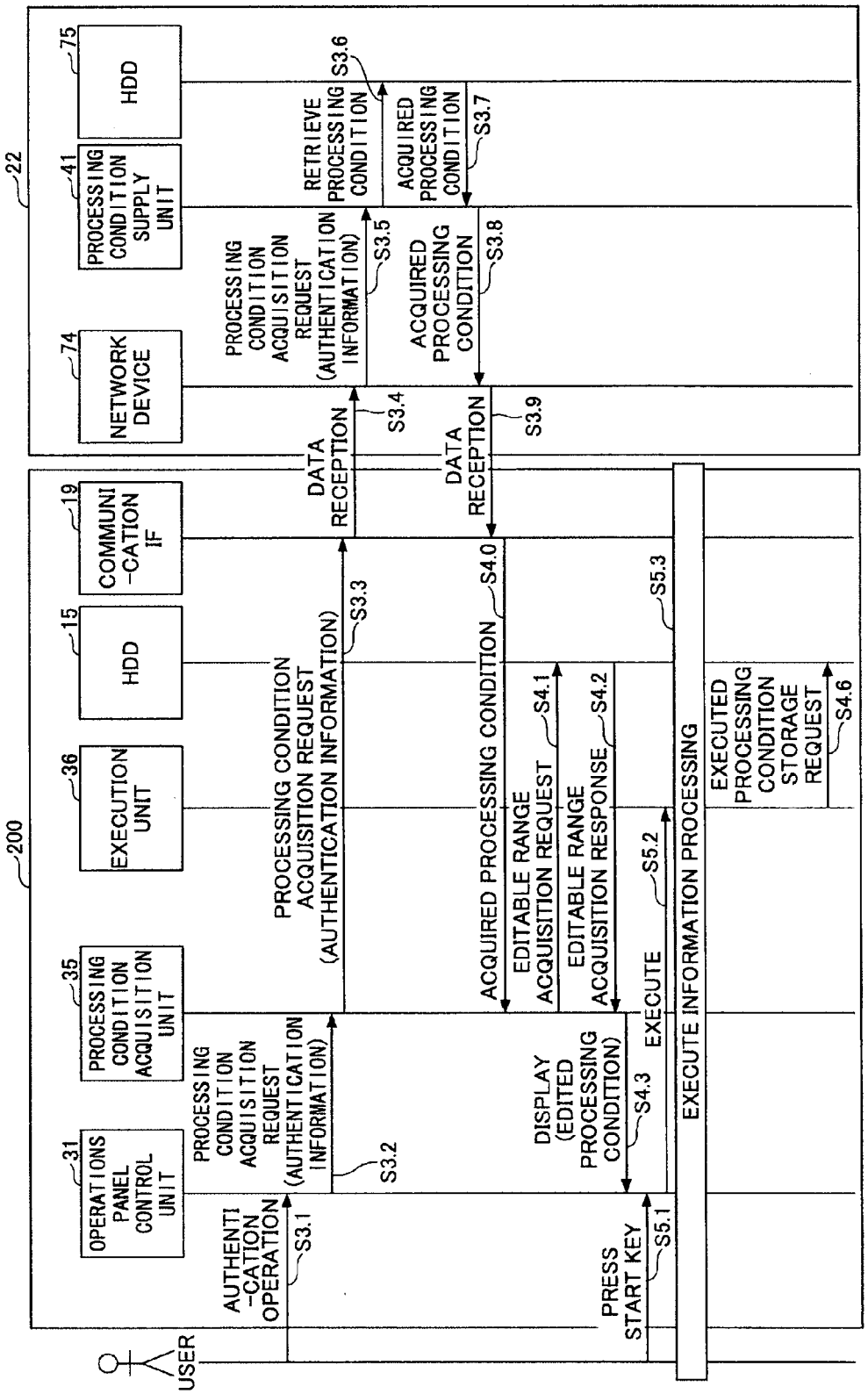
FIG. 17 is a sequence diagram illustrating another example of a procedure for the user to edit the processing condition obtained from the server based on the in-apparatus processing condition.

FIG. 17 is a sequence diagram illustrating another example of a procedure for the user to edit the processing condition based on the in-apparatus processing condition. In FIG. 17, a procedure in which the user logs into the image forming apparatus 200 and the user edits the processing condition is the same as that illustrated in FIG. 12, and therefore, its description is omitted.

When the user presses the "return" button 404 on the editing screen 403 illustrated in FIG. 13C, the operations panel 20 displays processing condition list screen 201 illustrated in FIG. 11A. When the user presses a "start" key of the hardware keyboard while a selected one of the "processing conditions n" buttons 202 to 204 remains highlighted, the operations panel control unit 31 receives a "start" command transmitted by the pressing of the start key (Step S5.1). The operations panel control unit 31 requests the execution unit 36 to execute the selected one of the "processing conditions n" (Step S5.2). The processing condition acquisition unit 36 sets the selected processing condition as parameters to execute the information processing (Step S5.3). That is, the image forming apparatus 200 reads a document to generate image data by setting the "address", the "document type", the "resolution", the "size", the "color mode", and the "file format" information of the selected processing condition as respective parameters.

When the execution unit 36 finishes the information processing based on the selected processing condition, the execution unit 36 registers the selected processing condition as an in-apparatus processing condition in the HDD 15 based on the above information items. That is, the processing condition is already registered in the HDD 15 as illustrated in FIG. 16, and when the execution unit 36 executes the processing condition that is already registered in the HDD 15, the execution unit 36 further registers the executed processing condition in the HDD 15.

However, in the second embodiment, since the image forming apparatus 200 only stores the processing conditions that it will actually execute, the storage required to hold in-apparatus processing conditions may be prevented from increasing. In addition, since the processing condition can be executed and registered by pressing of the "start" key, the operations of the image forming apparatus 200 may be simplified.

Third Embodiment

In an image forming apparatus utilization system according to a third embodiment, addresses to be displayed on the address addition screen 402 may be displayed based on the addresses sorted based on the addresses added in the past. With this configuration, the number of addresses to be registered in the in-apparatus processing condition may be gradually increased. The address item is different in this point from other items of the processing condition. Other items of the processing condition are more restricted by the hardware configuration (functions) and thus the data corresponding to items may not be increased so much. In addition, the size of the operations panel 20 is limited. Accordingly, when the addresses are displayed on the address addition screen 402, the addresses are displayed in the order of having the highest likelihood to the lowest likelihood to be selected by the user, thereby increasing the user's operability or usability.

Figure 18:
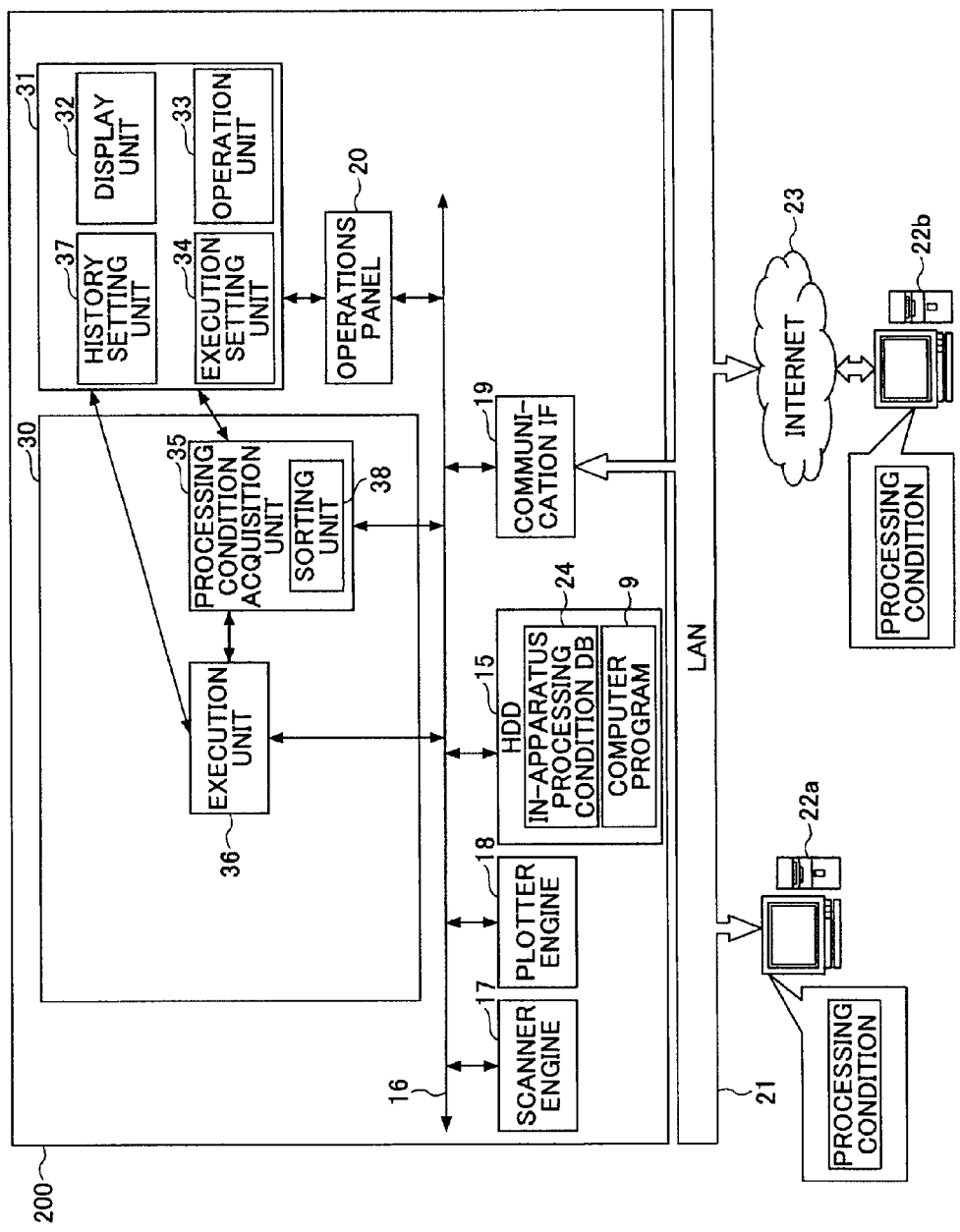
FIG. 18 is a functional block diagram illustrating an example of the image forming apparatus in a system configuration of the image forming apparatus utilization system.

FIG. 18 illustrates an example of a functional block diagram of the image forming apparatus 200 in the image forming apparatus utilization system 100 according to the third embodiment. Note that in FIG. 18, components identical to those of FIG. 3 are provided with the same reference numerals and their descriptions are omitted. In FIG. 18, the operations panel control unit 31 includes a history setting unit 37, and the processing condition acquisition unit 25 includes a sorting unit 38.

Figure 19:
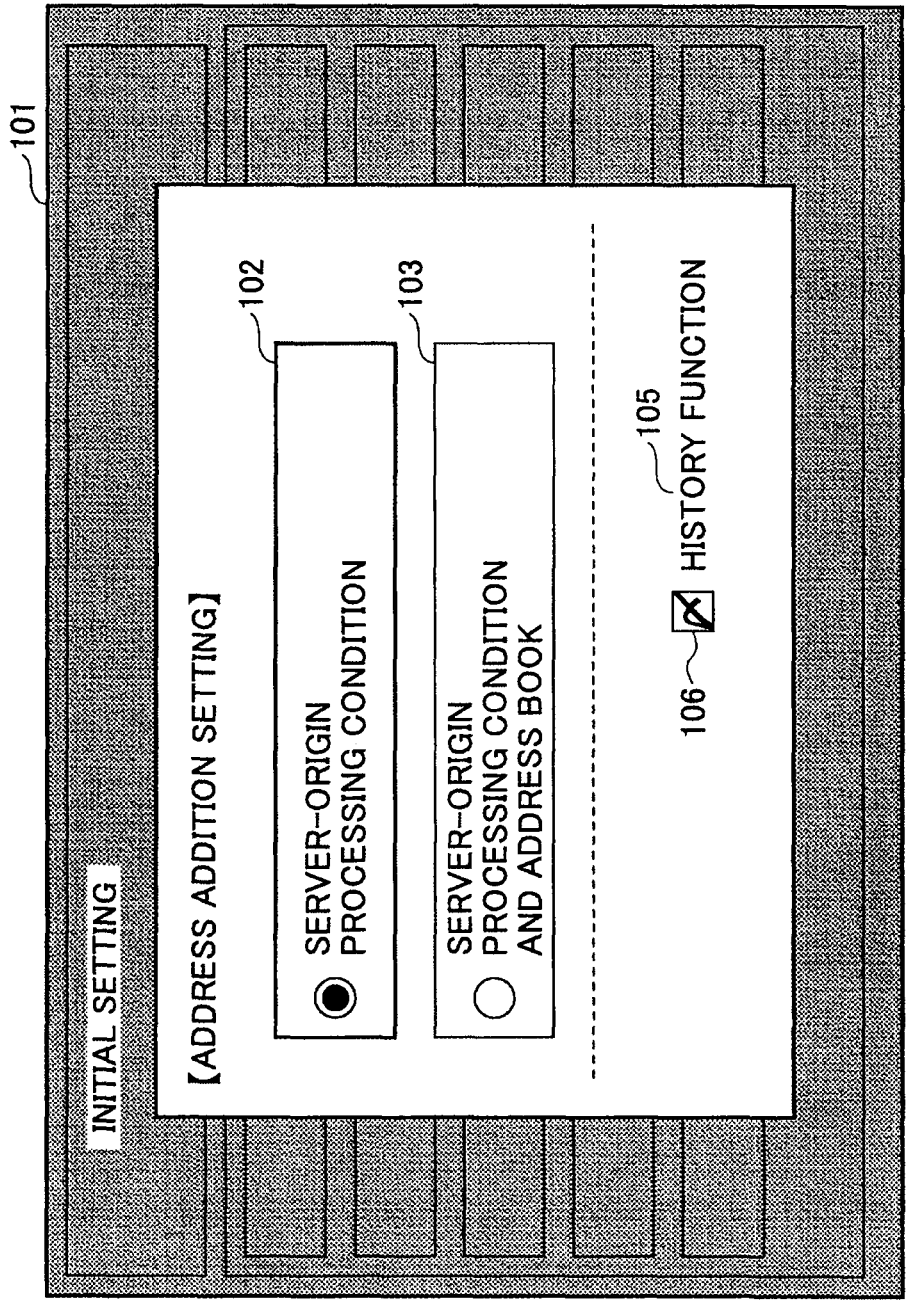
FIG. 19 is a diagram illustrating an example of a history function setting screen for activating (ON) or deactivating (OFF) a history function.

The history setting unit 37 receives an activation or a deactivation setting of a history function transmitted from the operations panel 20 via the operation of either the administrator or the user. FIG. 19 is a diagram illustrating an example of a setting screen for activating or deactivating the history function. FIG. 19 illustrates an example of the address addition setting screen 101; however, any screen may be accepted insofar as the activation or deactivation of the history function may be set. As illustrated in FIG. 19, a checkbox 106 is provided corresponding to the history function 105. When the user checks the checkbox 106 of the history function 105, the operations panel control unit 31 receives the activation of the history function, and notifies the history setting unit 37 of the activation of the history function.

The history setting unit 37 stores flags corresponding to the activation and deactivation of the history function in the HDD 15 or the ROM. The sorting unit 38 of the processing condition acquisition unit 35 determines whether to sort the addresses on the address addition screen 402 by referring to the flags. The sorting unit 38 sorts the addresses on the address addition screen 402 by referring to time stamp information of the processing condition stored in the HDD 15.

As illustrated in FIG. 13C, the operations panel control unit 31 adds the item (address) added by the user to the processing condition selected by the user in FIG. 11A. The operations panel control unit 31 transmits the processing condition including the address added by the user to the processing condition acquisition unit 35. Since the processing condition acquisition unit 35 transmits the (edited) processing condition to which the address is added to the execution unit 36, the execution unit 36 registers the processing condition including the added address edited by the user in the HDD 15.

The execution unit 36 registers time stamp information reflecting the time at which the address is added to the processing condition while registering the edited processing condition in the HDD 15. FIG. 20 is a diagram illustrating an example of an address book having time stamp information. Note that in FIG. 20, components identical to those of FIG. 8B are provided with the same reference numerals and their descriptions are omitted. A "time of addition" item is provided in the rightmost column of the addressbook shown in FIG. 20, with the address "takaka@dd.com" having been added three days ago and the address "ffff@gggg" having been added one day ago.

It is preferable that the number of times the time stamps are registered per address be five times in a retrospective manner (past five time stamps) including the latest one. In this manner, the frequency in use of each address may be computed.

When the address adding screen 402 in FIG. 13B is displayed, the sorting unit 38 sorts the addresses by referring to the time stamp information. The sorting unit 38 also transmits the sorted addresses to the operations panel control unit 31.

Figure 21:
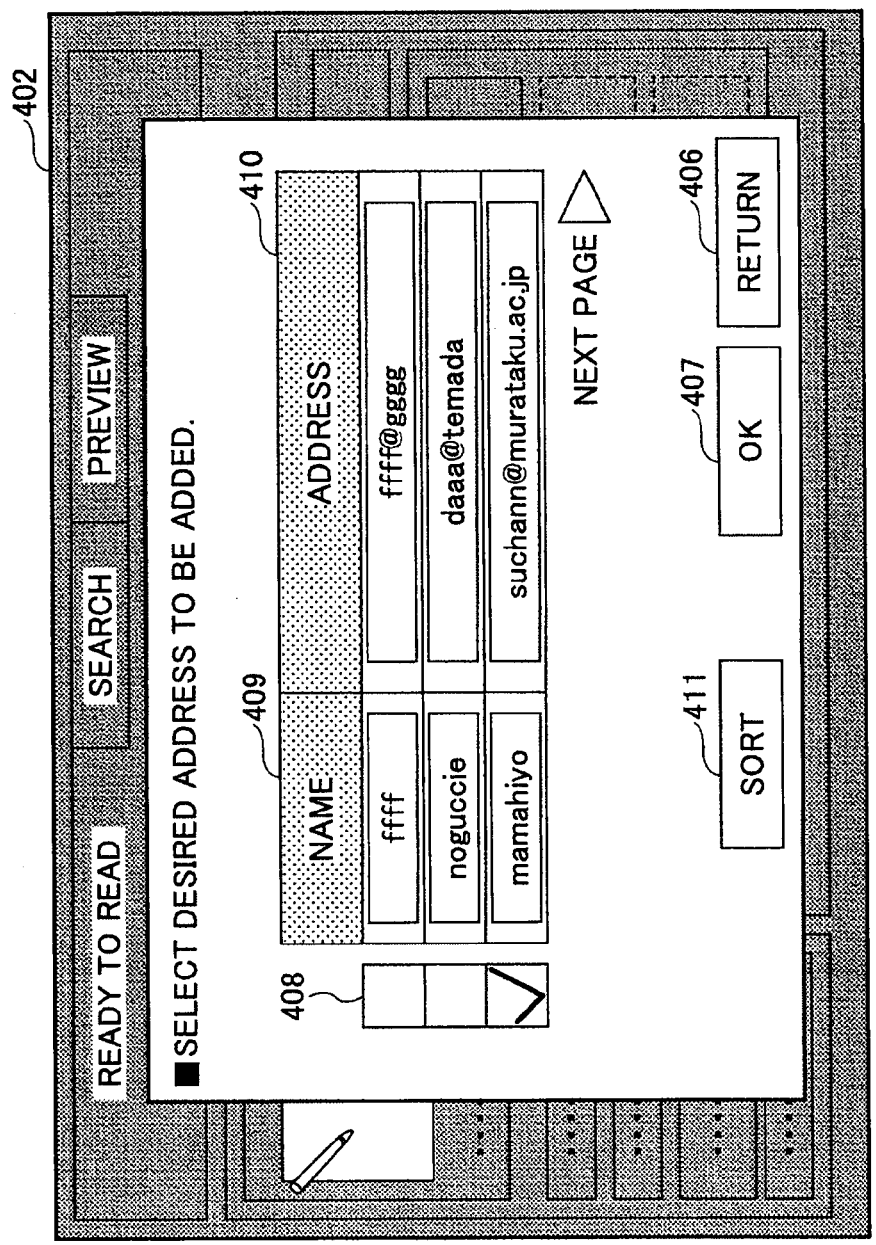
FIG. 21 is a diagram illustrating an example of an editing screen for editing the address book of the processing condition.
Figure 23:
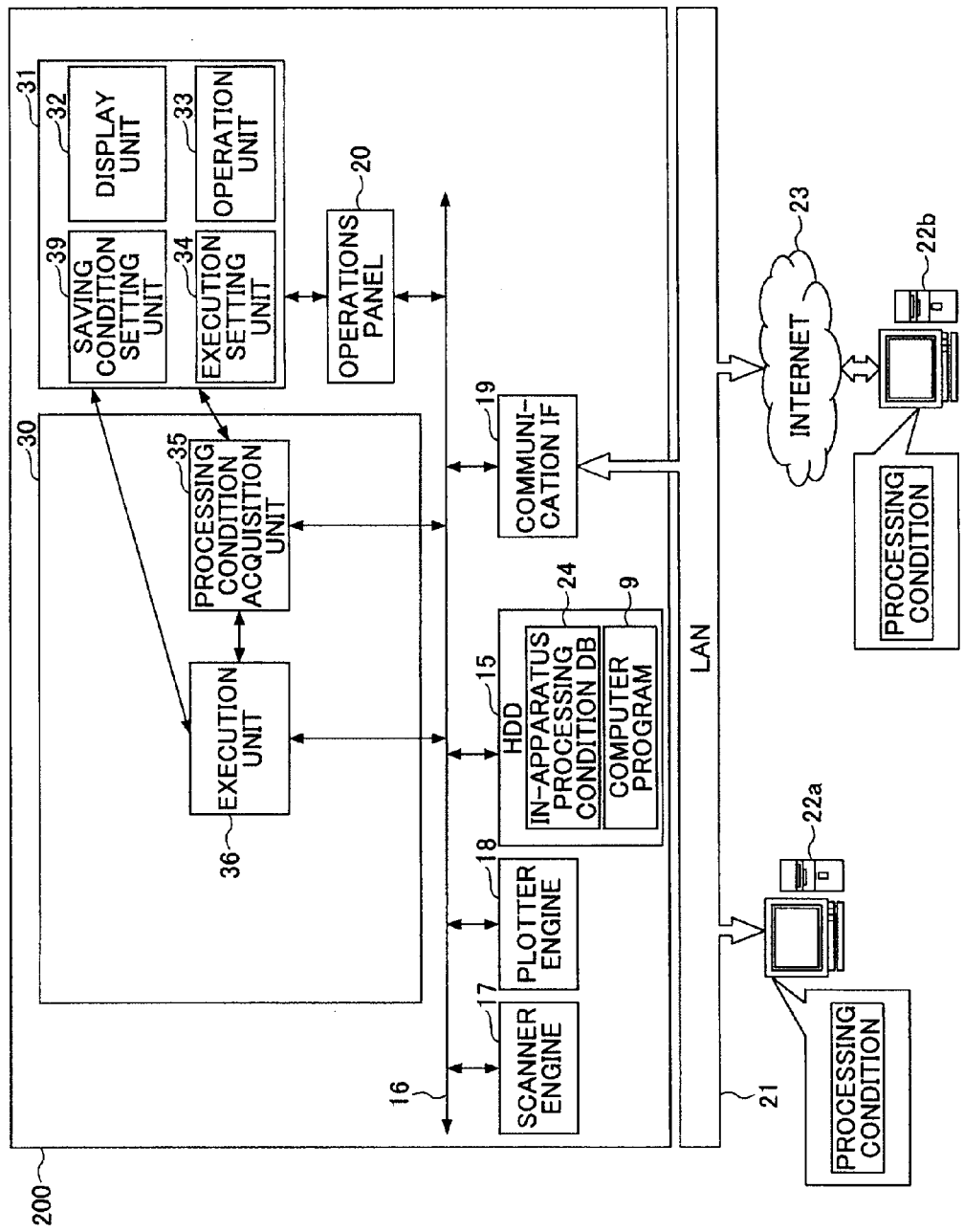
FIG. 23 is a functional block diagram illustrating another example of the image forming apparatus in the system configuration of the image forming apparatus utilization system.

According to the time stamp information in FIG. 23, the address that has been added most recently is "ffff@gggg", the one added next most recently is "suchann@murataku.ac.jp", and the one added further next most recently is "takaka@dd.com"; and the operations panel control unit 31 displays the addresses on the address addition screen 402 in this order. FIG. 21 is another example of the address addition setting screen 402 as shown in FIG. 13B. As illustrated in FIG. 21, the address "ffff@gggg" that has been added most recently is displayed on the top row, which is clearer when compared with the left side address addition screen 402 in FIG. 13B. The address that has been added is preferably displayed on the top row in the address addition screen 402 because the address is more likely to be reused. Therefore, the addresses are sorted based on the history of the use of the addresses to minimize the switching of screens or the scrolling of a scrolling bar of the screen when the address desired to be reused is added to the processing condition.

Note that the sorting order may be switched by pressing a "sort" button 411 displayed on the address addition screen 402 in FIG. 21. That is, every time the user presses the "sort" button 411, the sorting unit 38 sorts address factors in the order of "time stamp information", "alphabetical order", "inverse alphabetical order", or "frequency in use". In this manner, the operations panel control unit 31 displays the addresses to be added in a desired sorting order.

[Detailed Procedure in Determining Editable Range]

Figure 22:
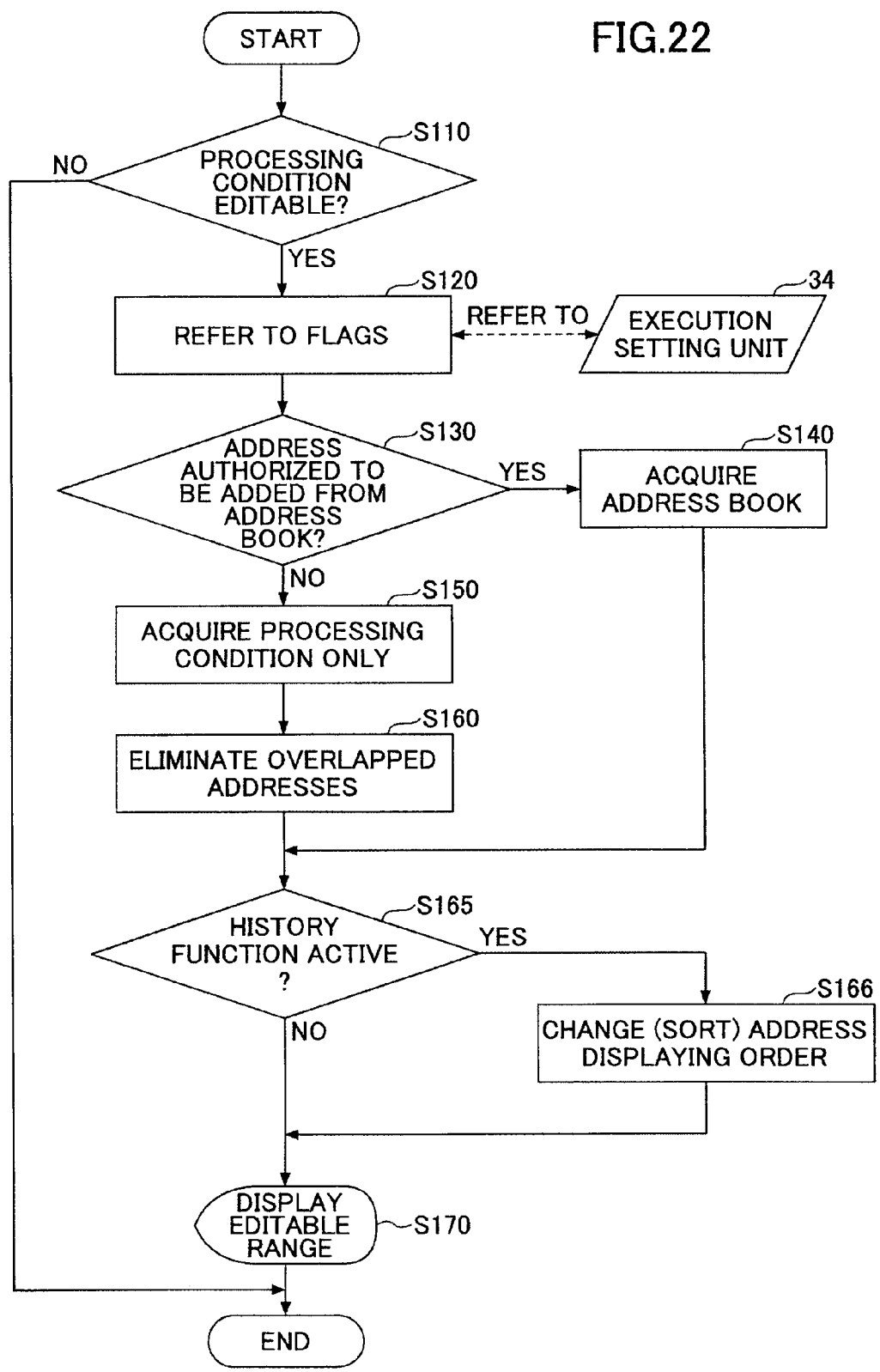
FIG. 22 is a flowchart illustrating another example of a procedure in which a processing condition acquisition unit determines the editable range.

FIG. 22 is a flowchart illustrating another example of a procedure in which an information processing condition acquisition unit 35 determines an editable range. In FIG. 22, Steps from the "start" to S160 are the same as illustrated in the flowchart in FIG. 15. First, the processing condition acquisition unit 35 determines whether the processing condition (acquired from the server 22) is editable (Step S110). The processing condition acquisition unit 35 determines whether the processing condition (acquired from the server 22) is editable based on whether the processing condition in question has an asterisk mark "*". If the processing condition in question has an asterisk mark "*" and is therefore uneditable (No of S110), the process of the flowchart in FIG. 22 ends.

However, if the processing condition is editable (Yes of S110), the processing condition acquisition unit 35 refers to the flags set by the execution setting unit 34 (Step S120). As described above, the editable range is defined based on the flags.

The processing condition acquisition unit 35 determines whether the editable range includes adding an address from the address book (Step S130). Note that the "adding of an address from the address book" corresponds to "(1) the first editable range including both the in-apparatus processing condition that is preliminarily stored in the HDD and the processing condition that is received from the server 22 and is stored in the HDD".

If the "adding of an address from the address book" is authorized (Yes of S130), the processing condition acquisition unit 35 retrieves the address book stored in the HDD 15 (Step S140). Note that the address book includes the in-apparatus processing condition.

If the "adding of an address from the address book" is not authorized (No of S130), the processing condition acquisition unit 35 retrieves only the processing condition that is received from the server 22 and is stored in the HDD 15 (Step S150).

Then, the processing condition acquisition unit 35 eliminates overlapped addresses between the addresses in the processing condition received from the server 22 and the addresses in the processing condition retrieved from the HDD 15 (S160).

Next, the sorting unit 38 determines whether the history function is active or inactive (Step S165). If the history function is inactive (No of S165), the sorting unit 38 displays none of the sorting orders of the addresses, and the processing condition acquisition unit 35 retrieves the addresses from the address book, eliminates overlapped addresses in the address book, and transmits the resulting addresses (remaining addresses) to the operations panel control unit 31.

If the history function is active (Yes of S165), the processing condition acquisition unit 35 retrieves the addresses from the address book and eliminates overlapped addresses in the address book, and the sorting unit 38 sorts the resulting addresses (remaining addresses) in a desired one of the sorting orders of the addresses based on the time stamp information (Step S166). The processing condition acquisition unit 35 transmits the addresses in the sorting order to the operations panel control unit 166.

As a result, the operations panel control unit 31 displays the address adding screen 402 illustrated in FIG. 21 (Step S170).

As described above, in the image forming apparatus utilization system 100 according to the third embodiment, since the processing condition received from the server 22 can be edited within a certain editable range, the usability of the image forming apparatus 200 may be improved while maintaining the certain security level. Further, the editable range can be varied to a certain extent, so that the usability and the security level of the image forming apparatus 200 can be appropriately controlled.

Accordingly, in the image forming apparatus utilization system 100 according to the third embodiment, when the addresses are displayed on the address adding screen 402, the addresses are displayed in the order of having the highest likelihood to the lowest likelihood to be selected by the user, thereby increasing the user's operability or usability.

Fourth Embodiment

In the first embodiment, the execution unit 36 registers the processing condition in the image forming apparatus 200 when the user presses the "register" button 206, and in the second embodiment, the execution unit 36 registers the processing condition in the image forming apparatus 200 when the user sets the processing condition in the image forming apparatus 200 and presses the "start" key. However, in either first or second embodiments, items of the processing condition to be registered in the HDD 15 may not be separately selected. Accordingly, in an image forming apparatus utilization system according to a fourth embodiment, the items of the processing condition to be registered in the HDD 15 are configured to be selected.

FIG. 23 illustrates an example of a functional block diagram of the image forming apparatus 200 in the image forming apparatus utilization system 100 according to a fourth embodiment. Note that in FIG. 23, components identical to those of FIG. 3 are provided with the same reference numerals and their descriptions are omitted. As illustrated in FIG. 23, the operations panel control unit 31 includes a saving condition setting unit 39.

The saving condition setting unit 39 receives a saving condition setting set via the operation of the operations panel 20 by either the administrator or the user. There are two saving conditions (R1) and (R2) that may be set.

(R1) The items of the processing condition to be registered in the HDD 15 are set in advance; those set items of the processing condition are registered in the HDD 15 by pressing either the "register" button or the "start" key.

(R2) The items of the processing condition to be registered in the HDD 15 are selected by the user in advance; the selected items of the processing condition are registered in the HDD 15 by pressing either the "register" button or the "start" key.

Figure 24A:
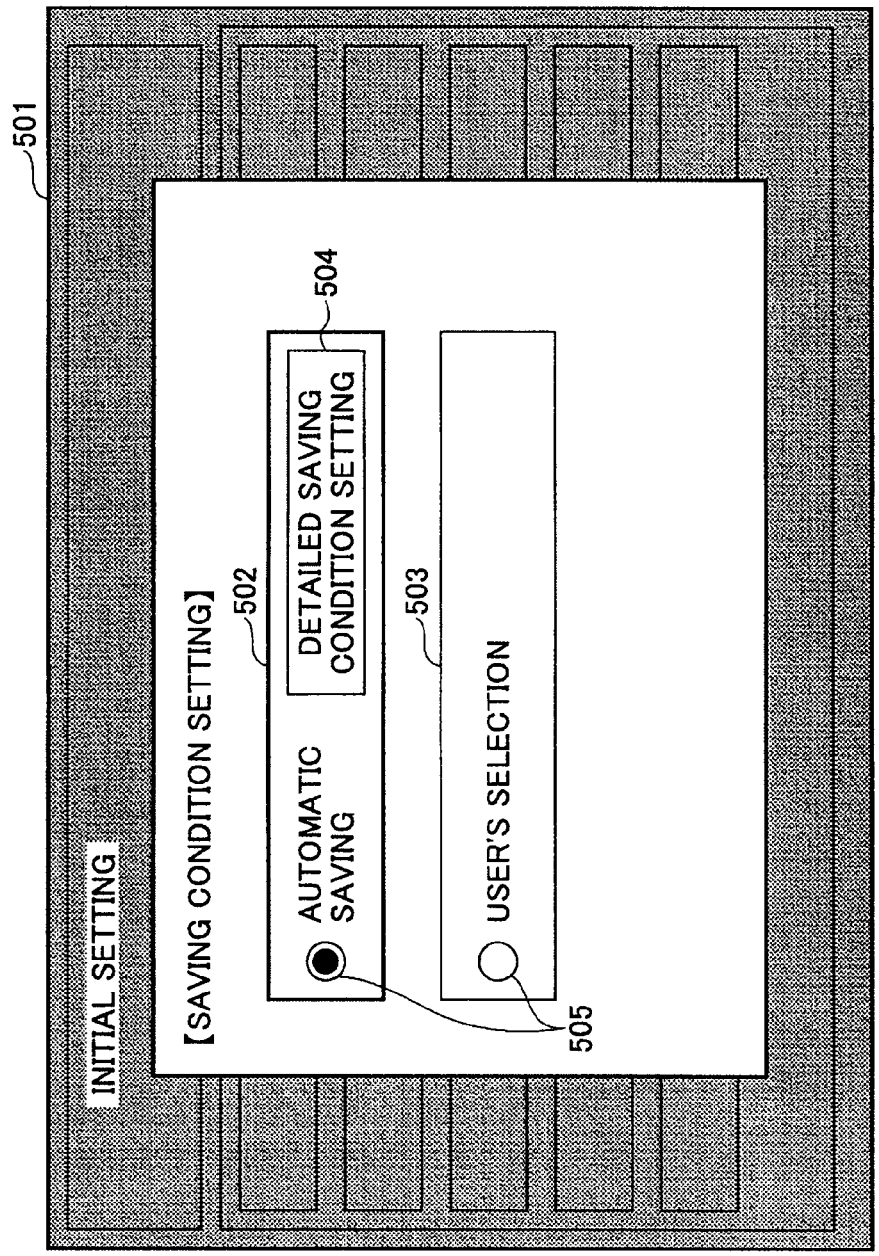
FIGS. 24A and 24B are diagrams illustrating examples of saving condition setting screens via which a saving condition is set by the user.
Figure 24B:
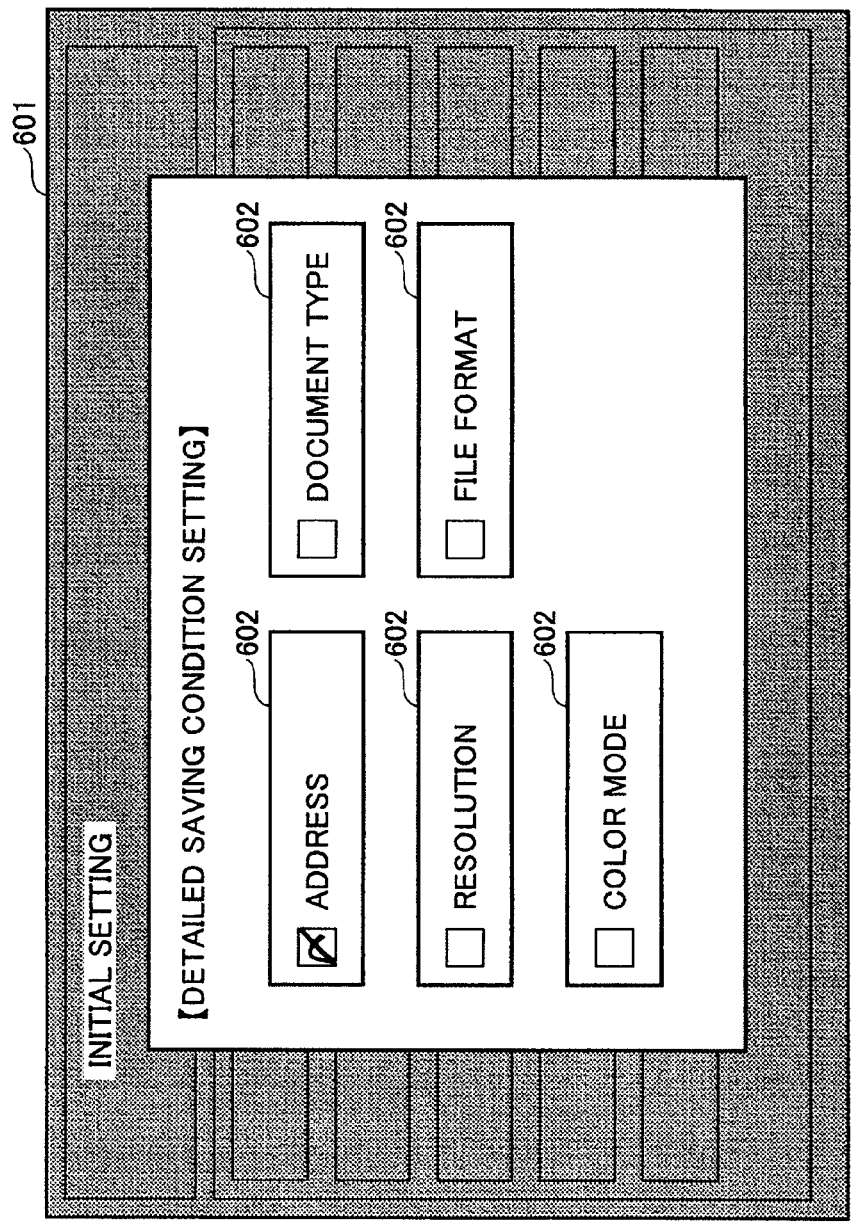

FIGS. 24A and 24B are diagrams illustrating examples of saving condition setting screens 501 and 60, respectively, via which a saving condition is set by the user. The saving condition setting screen 501 may be displayed when the administrator or the user presses an "initial system setting" key of the image forming apparatus 200 to display a screen having plural tabs and selects one of tabs of the screen. The saving condition setting screen 501 includes an "automatic saving" button 502 and a "user's selection" button 503. The "automatic saving" button 502 includes a "detailed saving condition setting" button 504. The "automatic saving" button 502 and the "user's selection" button 503 are exclusively selected by either the administrator's or the user's pressing one of "automatic saving" button 502 and the "user's selection" button 503. The selected button is displayed as a circular spot 505 that can contain a dot (for selected). When the "automatic saving" button 502 is selected, the "detailed saving condition setting" button 504 becomes active (selectable).

When the "automatic saving" button 502 is selected, the saving condition setting unit 39 sets the above condition (R1). Likewise, when the "user's selection" button 503 is selected, the saving condition setting unit 39 sets the above condition (R2). The selected one of the saving conditions is stored in the HDD 15 of the image forming apparatus 200 as one of the initial settings.

FIG. 24B is a diagram illustrating an example of a detailed saving condition setting screen 601 displayed by pressing the "detailed saving condition setting" button 504. The detailed saving condition setting screen 601 includes items of the "address", the "document type", the "resolution", the "file format", and the "color mode". The items 602 of the saving condition setting screen 601 can be separately selected by the administrator's or the user's pressing one of "address", the "document type", the "resolution", the "file format", and the "color mode" buttons. In FIG. 24B, the "address" button 602 is selected, so that the execution unit 36 registers only the address item of the processing condition acquired from the server 22 in the in-apparatus processing condition. The separate items of the processing condition are registered as part of the saving condition (R1) in the HDD 15.

Note that the detailed saving condition setting screen 601 illustrated in FIG. 24B is a diagram illustrating an example of the processing condition of the scanner application; however, the items of the processing condition of the printer application, the photocopy application, the faxing application, the scanner application, the net filing application (i.e., document box application), and the Web may also be separately set.

If the saving condition setting unit 39 sets the saving condition (R1), the items of the processing condition desired to be registered correspond to the items 602 set on the saving condition screen 601 illustrated in FIG. 24B, and the rest of the processing condition remains the same as that of the first embodiment and the second embodiment. However, if the saving condition setting unit 39 sets the saving condition (R2), a screen via which the user selects the items to be saved is displayed.

Figure 25:
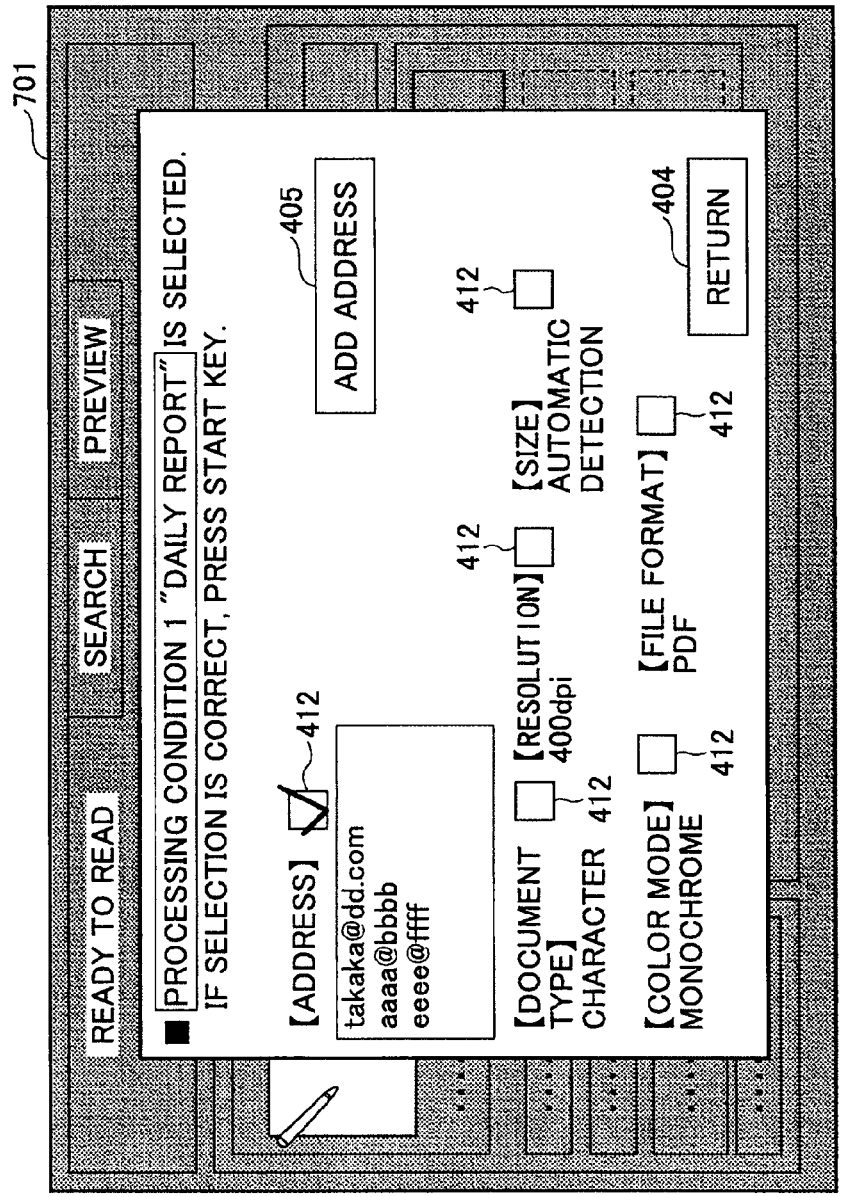
FIG. 25 is a diagram illustrating an example of an editing screen.

For example, if the user presses the "edit" button 207 on the processing condition list screen 201 illustrated in FIG. 11A, the operations panel control unit 31 displays the editing screen illustrated in FIG. 13A, via which the user selects desired item(s) of the saving condition. FIG. 25 is a diagram illustrating an example of the address addition setting screen 701. In FIG. 25, components identical to those of FIG. 13A are provided with the same reference numerals and their descriptions are omitted. As illustrated in FIG. 25, in the editing screen 701, the items of the processing condition each have a checkbox 412. When the user checks the checkbox 412 of a corresponding one of the items of the processing condition, the operations panel control unit 31 receives a command corresponding to the selected item of the processing condition, and notifies the execution unit 36 of the selected item of the processing condition. Accordingly, the execution unit 36 registers the selected item of the processing condition in the HDD 15 when the user presses the "register" button or the "start" key.

Note that a screen on which the user selects the item of the processing condition to be registered is not limited to the editing screen 701, and may be the processing condition detail screen 301 displayed by the user's pressing of the "detail" button 205 as illustrated as FIGS. 11B and 11C.

According to the third embodiment, the saving condition setting unit 39 can separately set the items of the processing condition to be registered in the HDD in advance as the initial setting via the saving condition setting screen 501, and the desired items of the processing condition selected by the user can be registered in the HDD 15.

According to embodiments of the present invention, there is provided an information processing apparatus, an information processing utilization system, and a method for editing a processing condition capable of improving the usability of the information processing apparatus while maintaining a certain security level of the information processing apparatus.

The descriptions of exemplary embodiments for implementing the invention have been provided heretofore. The present invention is not limited to these embodiments, but various variations and modifications may be made without departing from the scope of the present invention.

The present application is based on Japanese priority application No. 2009-170326 filed on Jul. 21, 2009, with the Japanese Patent Office, the entire contents of which are hereby incorporated by reference.

What is claimed is:
1. An information processing apparatus comprising:
an acquisition unit configured to acquire first processing condition information stored in a server via a network;
a processing condition storage unit configured to store the first processing condition information acquired from the server via the network;
a display unit configured to display the first processing condition information stored in the processing condition storage unit;
an edition receiving unit configured to receive an edition of the first processing condition information displayed on the display unit;
an execution unit configured to set the first processing condition information edited by the edition receiving unit to execute information processing based on the set first processing condition information; and
a processing condition registration unit configured to register the first processing condition information set by the execution unit in the processing condition storage unit,
wherein the processing condition storage unit further includes second processing condition information preliminarily stored in the information processing apparatus in addition to the first processing condition information acquired from the server via the network,
the display unit displays the second processing condition information preliminarily stored in the information pro- cessing apparatus in addition to the first processing condition information acquired from the server via the network, and the edition receiving unit receives the edition of the first processing condition information based on the second processing condition information preliminarily stored in the information processing apparatus in addition to the first processing condition information acquired from the server via the network, the information processing apparatus further comprising:

a history recording unit configured to record history information previously received by the edition receiving unit with respect to use of the first processing condition information acquired from the server via the network and the second processing condition information preliminarily stored in the information processing apparatus when the edition receiving unit receives the edition of the first processing condition information based on the second processing condition information preliminarily stored in the information processing apparatus in addition to the first processing condition information acquired from the server via the network, and a sorting unit configured to sort the first processing condition information acquired from the server via the network and the second processing condition information preliminarily stored in the information processing apparatus based on the history information on the use of the first processing condition information acquired from the server via the network and the second processing condition information preliminarily stored in the information processing apparatus, wherein the display unit displays the first processing condition information acquired from the server via the network and the second processing condition information preliminarily stored in the information processing apparatus in a sorted order based on the history information with respect to the use of the first processing condition information acquired from the server via the network and the second processing condition information preliminarily stored in the information processing apparatus.

2. The information processing apparatus as claimed in claim 1, wherein the display unit displays a common item of the first processing condition information acquired from the server via the network and the second processing condition information preliminarily stored in the information processing apparatus, and the edition receiving unit receives additional information with respect to the first processing condition information based on the common item of the first processing condition information acquired from the server via the network and the second processing condition information preliminarily stored in the information processing apparatus.

3. The information processing apparatus as claimed in claim 2, further comprising a setting receiving unit configured to receive one of a setting for displaying the first processing condition information acquired from the server via the network alone, a setting for displaying both the first processing condition information acquired from the server via the network and the second processing condition information preliminarily stored in the information processing apparatus, and a setting for displaying the common item of the first processing condition information acquired from the server via the network and the second processing condition information preliminarily stored in the information processing apparatus.

4. The information processing apparatus as claimed in claim 1, further comprising:

a registration condition setting receiving unit configured to receive setting items of the first processing condition information so that the processing condition registration unit registers the setting items of the first processing condition information received by the registration condition setting receiving unit, wherein the processing condition registration unit registers, when the registration condition setting receiving unit receives a desired one of the setting items of the first processing condition information, the desired one of the setting items of the first processing condition information received by the registration condition setting receiving unit.

5. The information processing apparatus as claimed in claim 4, wherein the display unit displays setting columns corresponding to the setting items of the first processing condition information acquired from the server via the network so that the desired one the setting items of the first processing condition information is selected via a selected one of the setting columns corresponding to the setting items of the first processing condition information, and the registration condition setting receiving unit receives, every time the first processing condition information is acquired from the server via the network, the selected one of the setting items of the first processing condition information such that the processing condition registration unit registers the selected one of the setting items of the first processing condition information.

6. The information processing apparatus as claimed in claim 4, wherein the registration condition setting receiving unit simultaneously receives, when a plurality of sets of the first processing condition information are acquired from the server via the network, a plurality of the selected one of the setting items of the plurality of sets of the first processing condition information.

7. The information processing apparatus as claimed in claim 4, wherein the registration condition setting receiving unit receives the selected one of the setting items of the first processing condition information such that the processing condition registration unit registers the selected one of the setting items of the first processing condition information every time the first processing condition information is acquired from the server via the network, or simultaneously receives the plurality of the selected one of the setting items of the plurality of sets of the first processing condition information when the plurality of sets of the first processing condition information are acquired from the server via the network.

8. The information processing apparatus as claimed in claim 1, wherein the processing condition registration unit registers, after the execution unit sets the first processing condition information to execute the information processing based on the set first processing condition information, the set first processing condition information in the processing condition storage unit.

9. The information processing apparatus as claimed in claim 1, wherein the processing condition registration unit registers, when the processing condition registration unit receives a registration instruction to register the first processing condition information assigned by a user, the first processing condition information set by the execution unit in the processing condition storage unit.

10. An information processing apparatus utilization system comprising: a server and an information processing apparatus mutually connected to each other via a network,
wherein the server includes
a processing condition database including first processing condition information; and
a supply unit configured to supply, in response to a request transmitted from the information processing apparatus, the first processing condition information to the information processing apparatus via the network, and
wherein the information processing apparatus includes an acquisition unit configured to acquire the first processing condition information stored in the server via the network;
a processing condition storage unit configured to store the first processing condition information acquired from the server via the network;
a display unit configured to display the first processing condition information stored in the processing condition storage unit;
an edition receiving unit configured to receive an edition of the first processing condition information displayed on the display unit;
an execution unit configured to set the first processing condition information edited by the edition receiving unit to execute information processing based on the set first processing condition information; and
a processing condition registration unit configured to register the first processing condition information set by the execution unit in the processing condition storage unit,
wherein the processing condition storage unit further includes second processing condition information preliminarily stored in the information processing apparatus in addition to the first processing condition information acquired from the server via the network,
the display unit displays the second processing condition information preliminarily stored in the information processing apparatus in addition to the first processing condition information acquired from the server via the network, and
the edition receiving unit receives the edition of the first processing condition information based on the second processing condition information preliminarily stored in the information processing apparatus in addition to the first processing condition information acquired from the server via the network,
the information processing apparatus further comprising:
a history recording unit configured to record history information previously received by the edition receiving unit with respect to use of the first processing condition information acquired from the server via the network and the second processing condition information preliminarily stored in the information processing apparatus when the edition receiving unit receives the edition of the first processing condition information based on the second processing condition information preliminarily stored in the information processing apparatus in addition to the first processing condition information acquired from the server via the network, and
a sorting unit configured to sort the first processing condition information acquired from the server via the network and the second processing condition information preliminarily stored in the information processing apparatus based on the history information on the use of the first processing condition information acquired from the server via the network and the second processing condition information preliminarily stored in the information processing apparatus,
wherein the display unit displays the first processing condition information acquired from the server via the network and the second processing condition information preliminarily stored in the information processing apparatus in a sorted order based on the history information with respect to the use of the first processing condition information acquired from the server via the network and the second processing condition information preliminarily stored in the information processing apparatus.

11. A method for editing a processing condition in an information processing apparatus including a processing condition storage unit configured to store first processing condition information acquired from a server via a network and an execution unit configured to set the first processing condition information to execute information processing based on the set first processing condition information, the method comprising:
acquiring the first processing condition information stored in the server via the network;
displaying the first processing condition information acquired from the server via the network;
receiving an edition of the first processing condition information displayed in the displaying step; and
registering the first processing condition information edited in the receiving step in processing condition storage unit,
wherein the processing condition storage unit further includes second processing condition information preliminarily stored in the information processing apparatus in addition to the first processing condition information acquired from the server via the network,
the method further comprising:
displaying the second processing condition information preliminarily stored in the information processing apparatus in addition to the first processing condition information acquired from the server via the network, and
receiving the edition of the first processing condition information based on the second processing condition information preliminarily stored in the information processing apparatus in addition to the first processing condition information acquired from the server via the network,
recording history information previously received with respect to use of the first processing condition information acquired from the server via the network and the second processing condition information preliminarily stored in the information processing apparatus when the edition of the first processing condition information based on the second processing condition information preliminarily stored in the information processing apparatus is received in addition to the first processing condition information acquired from the server via the network, and
sorting the first processing condition information acquired from the server via the network and the second processing condition information preliminarily stored in the information processing apparatus based on the history information on the use of the first processing condition information acquired from the server via the network and the second processing condition information preliminarily stored in the information processing apparatus, wherein the displaying the first processing condition information displays the first processing condition information acquired from the server via the network and the second processing condition information preliminarily stored in the information processing apparatus in a sorted order based on the history information with respect to the use of the first processing condition information acquired from the server via the network and the second processing condition information preliminarily stored in the information processing apparatus.

* * * * *